United States Patent [19]

Hutcheson et al.

[11] 4,197,427

[45] Apr. 8, 1980

[54] DUAL-PROCESSOR LINE CONCENTRATOR SWITCHING SYSTEM

[75] Inventors: Alan G. Hutcheson, Sparks; William R. Bonham; Calvin H. DeCoursey, both of Reno, all of Nev.; James H. Glaser, Bonham, Tex.; Richard D. Ross, Reno, Nev.; Wook R. Shim, Rohnert Park, Calif.

[73] Assignee: Lynch Communication Systems, Inc., Reno, Nev.

[21] Appl. No.: 850,592

[22] Filed: Nov. 11, 1977

[51] Int. Cl.² ............................................. H04Q 3/60
[52] U.S. Cl. ............................................... 179/18 FC
[58] Field of Search .................................... 179/18 FC

[56] References Cited

U.S. PATENT DOCUMENTS 3,592,970   7/1971   Capetti et al. .................. 179/18 FC Primary Examiner—William C. Cooper Attorney, Agent, or Firm—Phillips, Moore, Weissenberger, Lempio & Majestic

[57] ABSTRACT

A switching system is disclosed for the concentration of a plurality of telephone lines onto a lesser plurality of intermediate trunks, wherein an independent processor is included at both ends of the concentrator system. These processors communicate with each other over a randomly chosen idle trunk, thereby negating the need for a dedicated communication link between the processors. Each processor controls the switching functions at its end of the concentrator, independently monitors and retains trunk status, subscriber line status and system operational status, and provides system fault detection, diagnosis and recovery including communication to maintenance personnel of trouble codes based on the detected fault and its diagnosis. Manual interaction with the system is also enabled at either end of the concentrator system via display and input/output units or remote from both ends.

27 Claims, 14 Drawing Figures

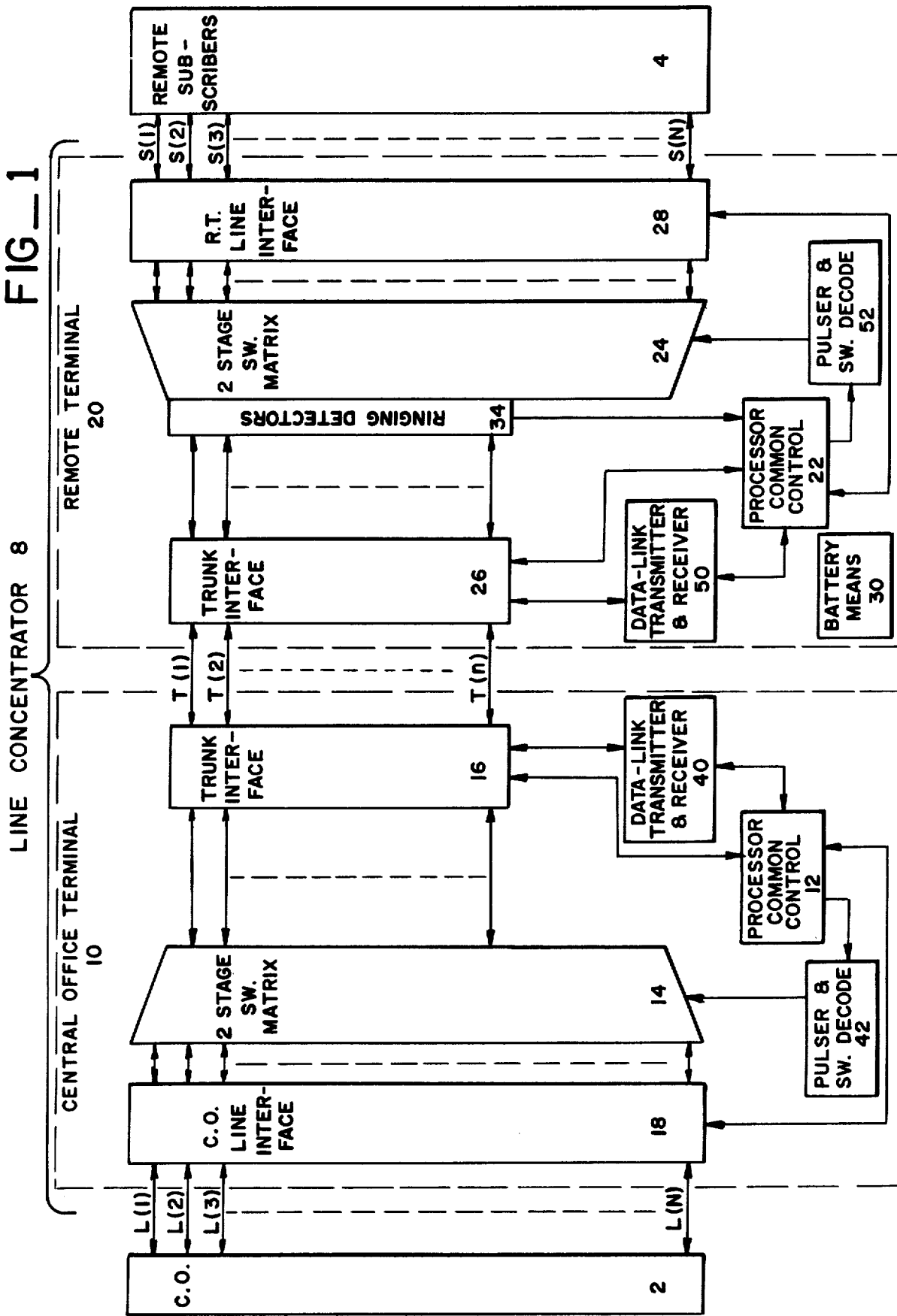

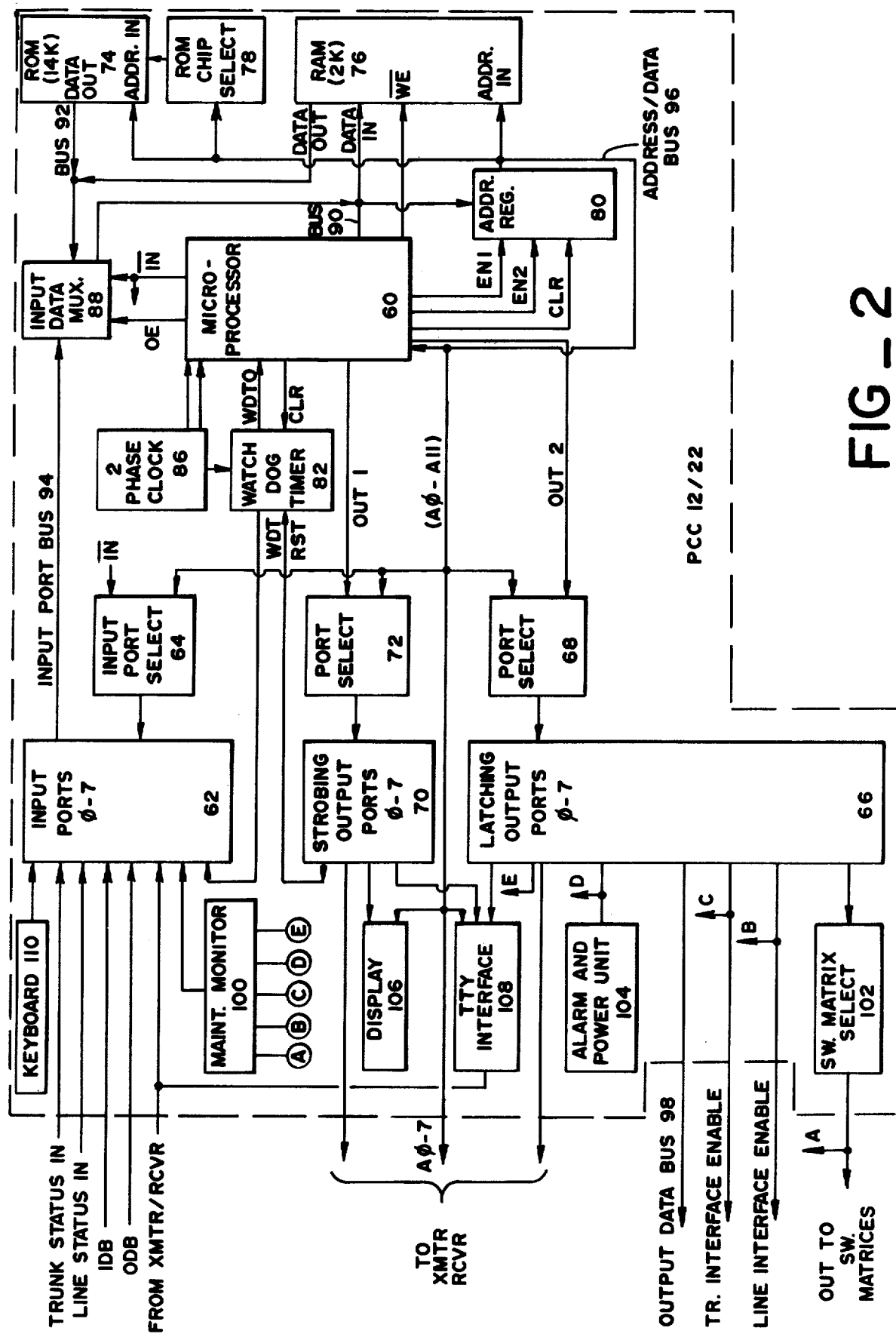
FIG_2

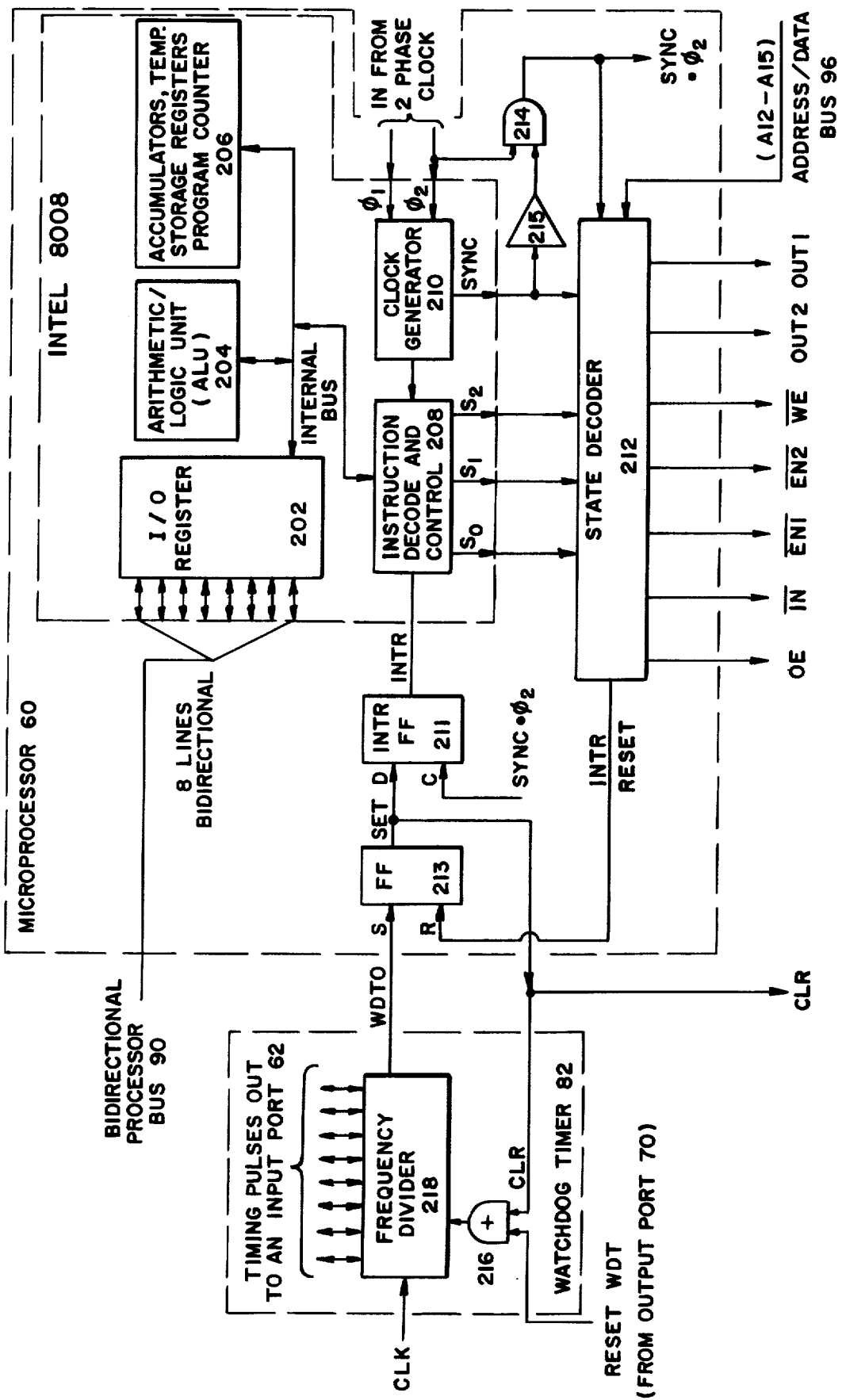
FIG_3

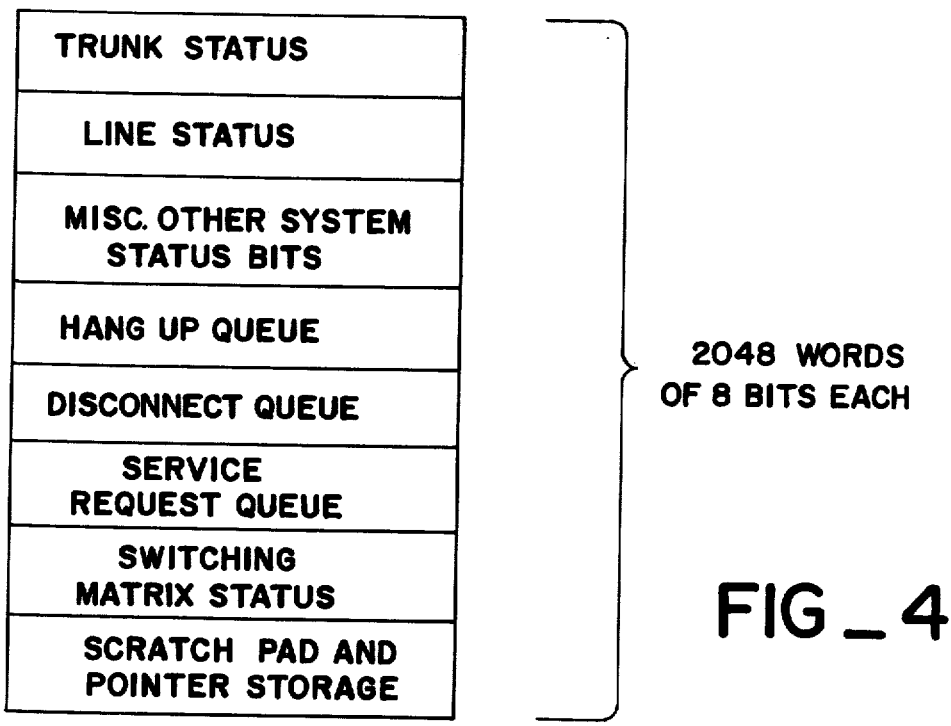
FIG_4
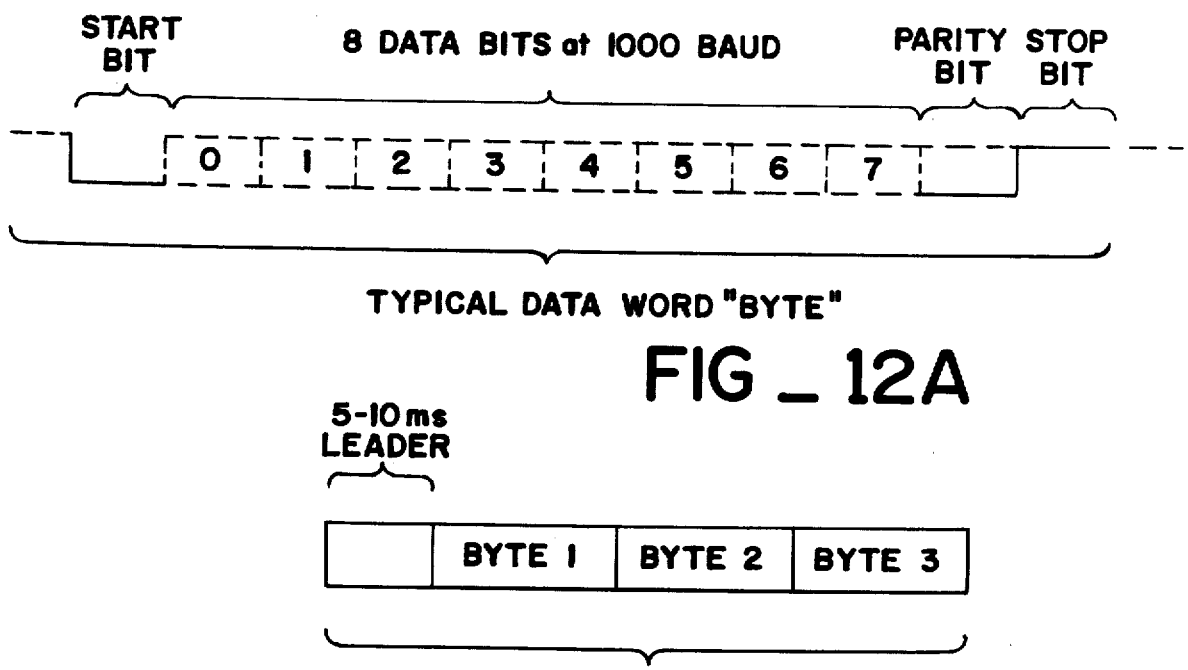
FIG_12A
FIG_12B

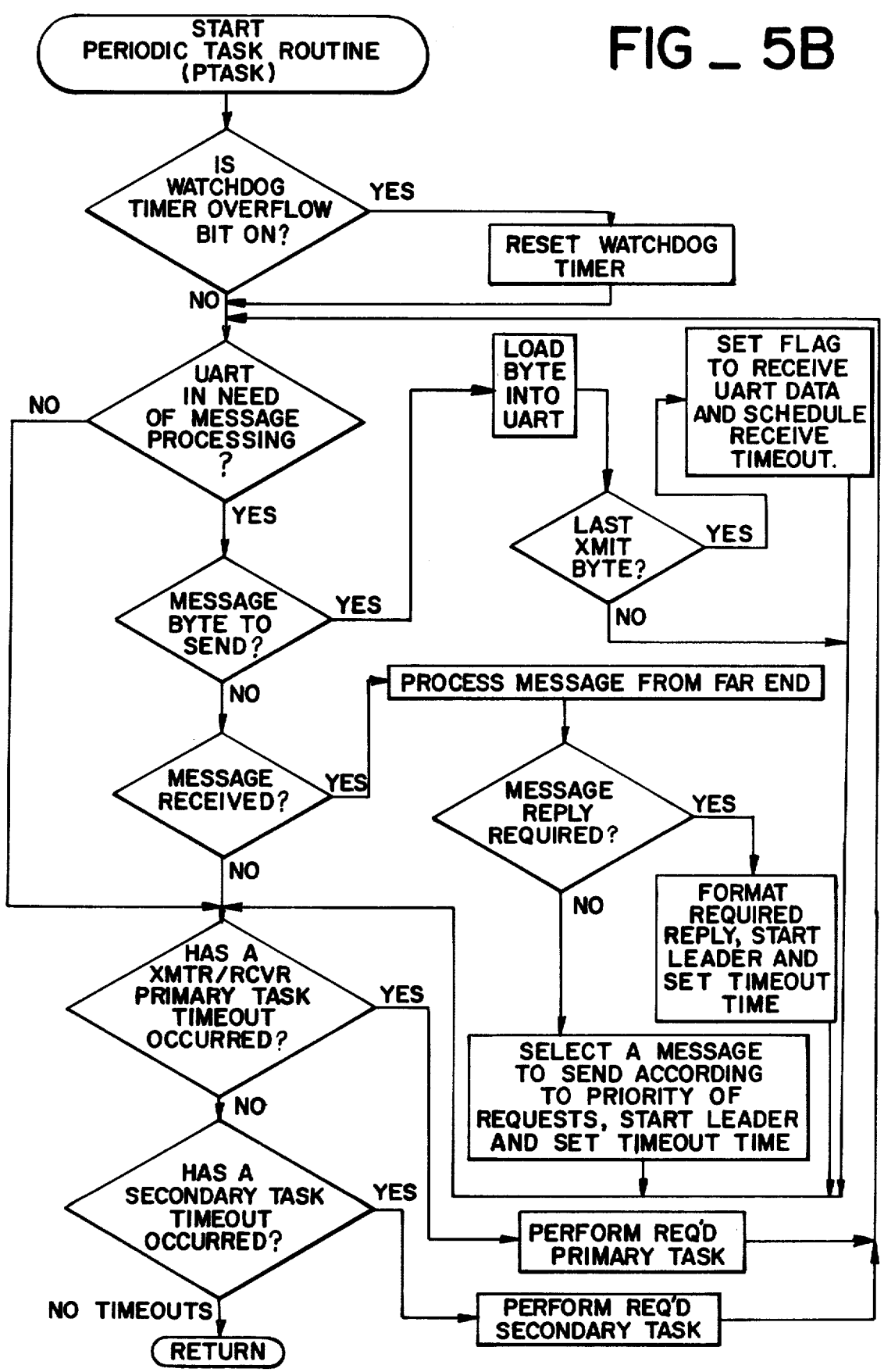
FIG_5B

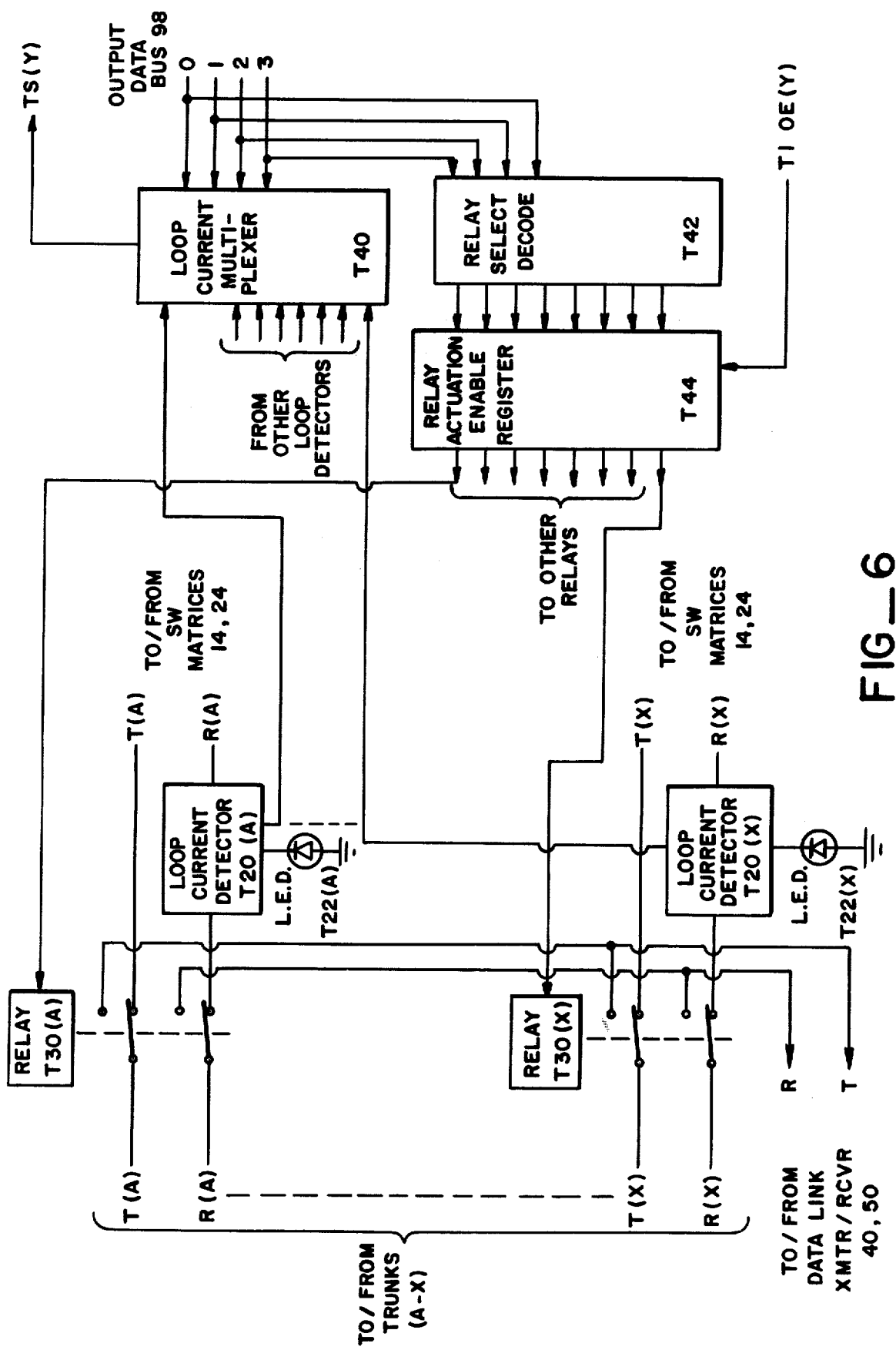
FIG_6

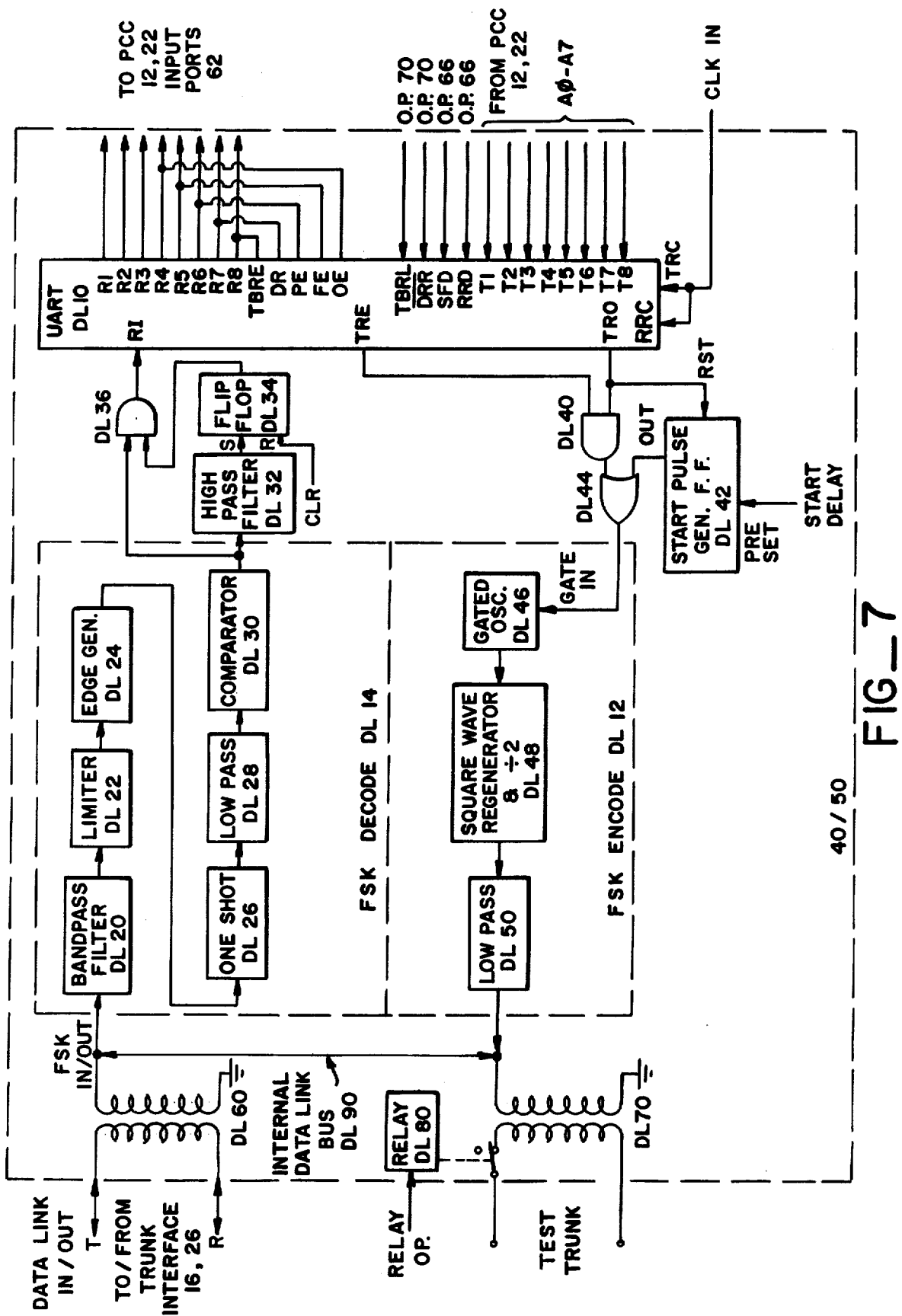

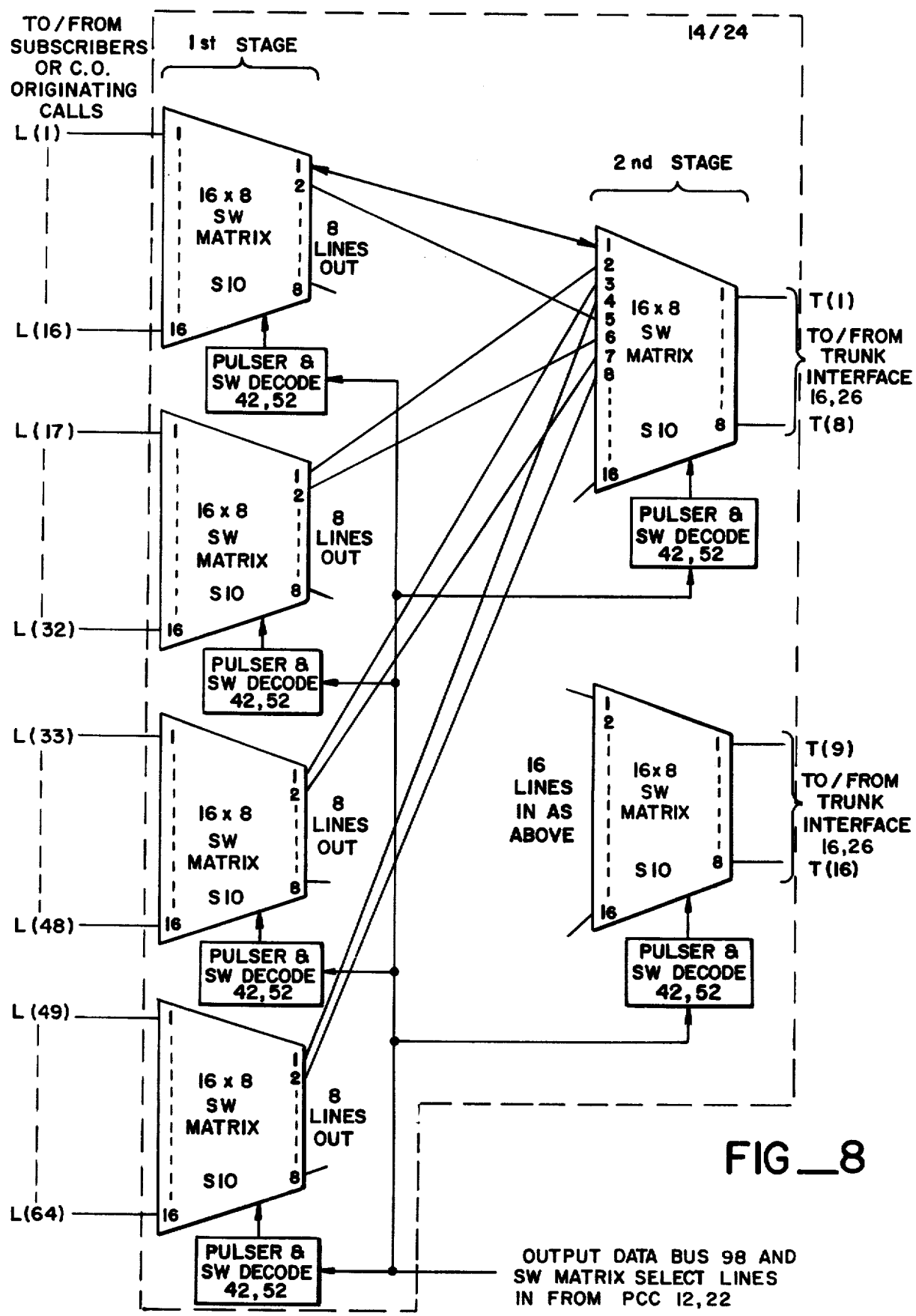
FIG_8

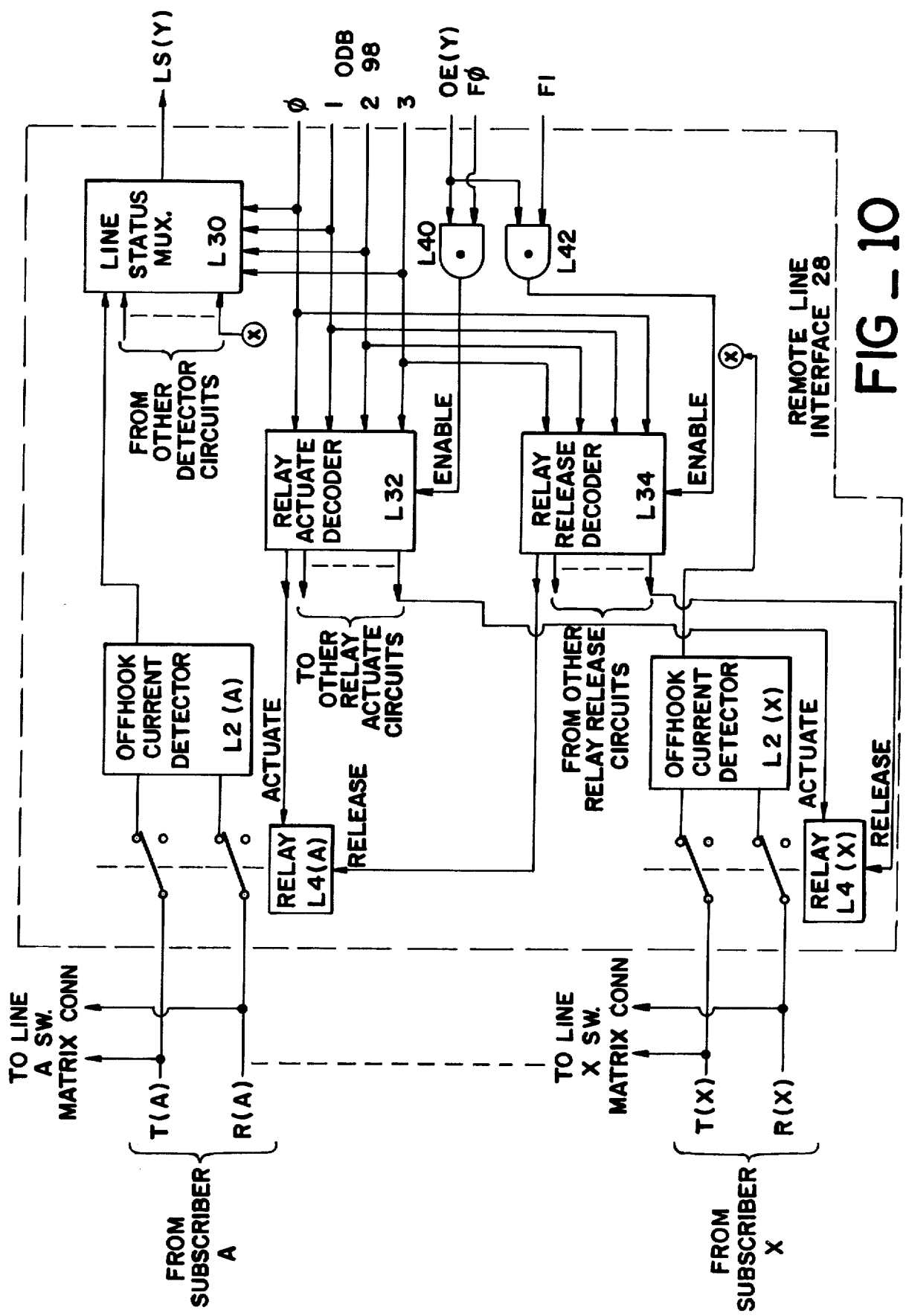
FIG_10

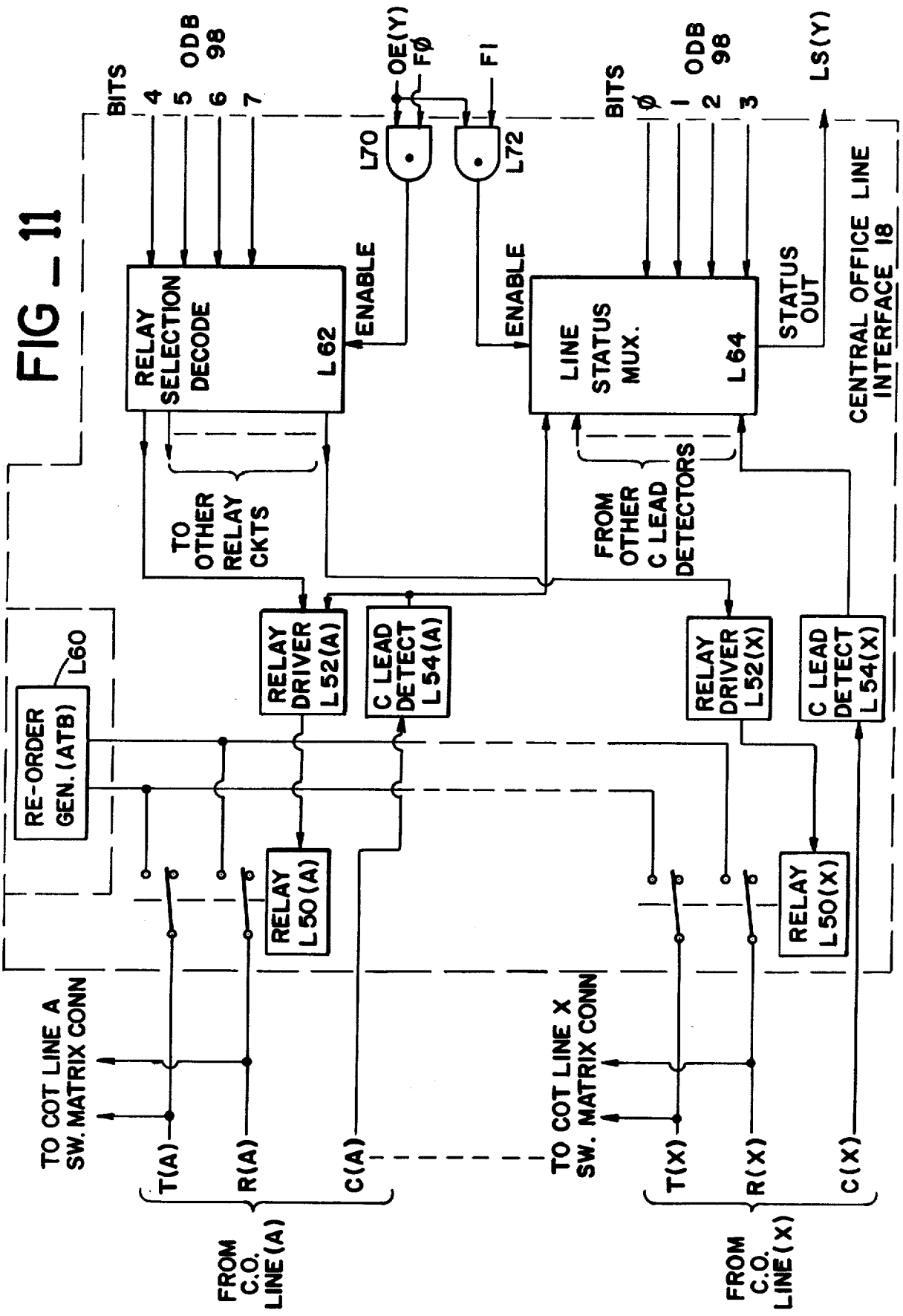

DUAL-PROCESSOR LINE CONCENTRATOR SWITCHING SYSTEM

BACKGROUND OF THE INVENTION

1. Field of the Invention

The present invention relates generally to telephone line concentrator switching systems and, more particularly, to a concentrator system that includes a processor at each end of the concentrator for independent control, at both ends of the concentrator, of switching functions, error checking, and other functions.

2. Description of the Prior Art

Since not all subscribers require service at any one time, there is no need to have an equal number of connections between a group of subscribers and a telephone central office. Line concentrators were therefore developed to concentrate the number of subscriber lines into a lesser number of trunks which would then be extended to the central office. Such an arrangement, however, was found to be cost-competitive compared to in-place cable only for relatively simple line concentrator switching systems.

In the past, line concentrators tended to be large electromechanical devices, requiring a high degree of maintenance, or devices that could operate only using a subscriber carrier or only if a system were connected to a certain type of telephone switching system.

Also, maintenance could not be easily performed at the remote end of the concentrator except on the most expensive of systems, because there was little or no way of checking whether an error correction made by maintenance personnel at the remote unit was effective in eliminating the problem. This is because system fault or malfunction indicators were minimal or nonexistent at the remote unit. In addition, except for the most basic of maintenance routines, any check-out of a line concentrator required the interaction of maintenance personnel to enable the detection of errors and error diagnosis. Often a system had to be taken out of service before such error correction tests could be performed. Only recently have separate monitoring systems been developed to aid in the maintenance of such switching systems. Even these systems, however, have not heretofore been inexpensively incorporated as an integral part of a line concentrator system.

The present invention takes advantage of state-of-the-art microcircuits to create a flexible and powerful line concentrator system that is cost competitive in comparison with the alternative of adding further trunk paths, while allowing substantial improvements in operation over prior concentrator devices to be made. The present invention allows full system check-out to be made, at either the central office unit or the remote unit, of any system faults or errors which have been automatically discovered by the unit. Full control over system operation and access to trouble codes and systems status is available to maintenance personnel at both the central office terminal and at the remote terminal. The invention also provides other unique features in the areas of real-time maintenance of trunks and lines, intercommunication between the central office terminal and remote terminal over idle trunks, and other advantages as described herein. Patents of general interest include U.S. Pat. No. 3,980,839 issued Sept. 14, 1976, a maintenance monitor for telephone switching systems, and U.S. Pat. No. 3,917,908, issued Nov. 4, 1975, a call concentrator control system.

SUMMARY OF THE INVENTION

The present invention consists of two units or terminals, a central office terminal and a remote terminal interconnected by up to 32 trunks. Both terminals contain circuitry that function almost identically. The present invention is designed to switch up to 128 lines onto a maximum of 32 trunks. Either terminal can accept incoming requests for service from one of its respective lines and can create a subscriber signal path through its own switching network, through an idle trunk, and finally through the other terminal's switching network. The two terminals continuously communicate with each other over a data link, maintained on an idle trunk, for the exchanging of the requisite switching status information and other data. The present invention can be used on a trunk facility that is made up of physical cable pairs, carrier trunks, or any other types of transmission facility, and is electronically transparent to the subscriber line, introducing no loss or gain. Also, no alterations or modifications to the associated central office subscriber lines is necessary to install the present invention.

Each terminal contains five main sections: (1) a processor common control; (2) data link generation and reception means; (3) a line interface; (4) a trunk interface; and (5) a two-wire stage switching matrix network.

The processor common control consists of a microprocessor controlled by a control program stored in a non-destructive read-only memory (ROM), a random access memory (RAM), and terminal input/output means. The RAM is used to store the current status of lines and trunks, for scratch pad use by the microprocessor, for storage of system errors discovered, and for storage of certain other indicators periodically needed by the microprocessor. The microprocessor is capable of performing arithmetic and logical operations as well as control and sensing functions. The input/output functions of the processor common control are performed via a plurality of input and output ports and their related control circuitry under the overall control of the microprocessor and control program. Finally, maintenance personnel interaction with a terminal is via the terminal input/output means of the common control unit. This means includes a keyboard for inputting of commands or data requests, a four-digit hexadecimal display for displaying data and trouble codes, a teletype interface, and various alarm indicators. Monitoring of the interterminal communications via the data link is also possible at a distance from the concentrator system, as will be described herein.

The line and trunk interface units provide detection of subscriber service requests, trunk idle status, data link switching from one idle trunk to the next, etc. A transmitter/receiver in each terminal allows the processor common control units to converse with each other via a data link path on an idle trunk. The data is transmitted as a serial bit string, and at a slow enough bit rate such that no special high speed transmission characteristics are needed for the host trunk.

Accordingly, it is a principal object of the present invention to provide a line concentrator system that takes advantage of the inherent flexibility, low cost, and expanded system control of co-equally operating, microprocessor controlled, terminals at both ends of the concentrator.

Another object of the present invention is to provide a system that takes advantage of the compactness and hardware simplifications inherently made possibly by state-of-the-art microcircuits.

Yet another object of the present invention is to provide for data link communication between concentrator terminals over an idle trunk, thus negating the need for a dedicated trunk useable only for such communication. Note that in the present invention if all trunks are busy, there is no need for data link communication.

A further object of the present invention is to enable performance of real-time system maintenance checking from either terminal, both automatically by the system and via maintenance personnel commands, without requiring system shutdown. Also enabled is the readout at either terminal of system errors discovered including error diagnosis, such that maintenance personnel are directed to specific repairs to be performed.

Still another object of the present invention is to take advantage of the processor common control in each terminal for the independent retention in both terminal of line and trunk status, to enable the retention of system operational status by at least one terminal in case of power failure at the other end.

A still further object of the present invention is to insure that a trunk is operational before a path is switched through it, by periodically using this intended trunk as the temporary processor common control data link, for intercommunication between the terminals. If either of the process common control units find the trunk to be inoperative, neither will switch in a subscriber over this path but will instead search for a new idle trunk that is operational.

Yet still another object of the present invention is to provide for each processor common control to have the ability to automatically discover, store, and display system operational faults or errors, to lock out the lines or trunks corresponding to these errors if possible until repaired, and to tell maintenance personnel how to repair the detected errors, to thereby minimize maintenance personnel training required for maintaining proper system operation and to enable maintenance personnel interaction with the system to be minimal when such interaction is required.

Yet another object of the present invention is to provide automatic traffic usage analysis for determination of heavy subscriber usage on a particular line, group of lines, etc. Such analysis enables the even distribution of high usage and low usage subscribers over all line groups.

BRIEF DESCRIPTION OF THE DRAWINGS

These and other objects and advantages of the present invention will become more apparent upon reference to the following description and the accompanying drawings in which:

FIG. 1 illustrates in general block diagram form a line concentrator system according to the present invention;

FIG. 2 is a more detailed block diagram of the processor common control unit shown in FIG. 1;

FIG. 3 illustrates an embodiment of the microprocessor unit shown in FIG. 2;

FIG. 4 is a block diagram depicting memory allocations of the RAM memory shown in FIG. 2;

FIG. 6 is a schematic of one of the trunk interface units shown in FIG. 1, and related circuits;

FIG. 7 illustrates an embodiment of the transmitter/receiver and data link generator shown in FIG. 1;

FIG. 8 is a detailed block diagram of a two-stage switching matrix shown in FIG. 1;

FIG. 10 is a detailed block diagram of the remote terminal line interface unit shown in FIG. 1;

FIG. 11 is a detailed block diagram of the central office terminal line interface unit shown in FIG. 1; and FIGS. 12A and B illustrate the timing and format of a typical data link message.

DESCRIPTION OF THE PREFERRED EMBODIMENT

1. GENERAL

Figure 5A:
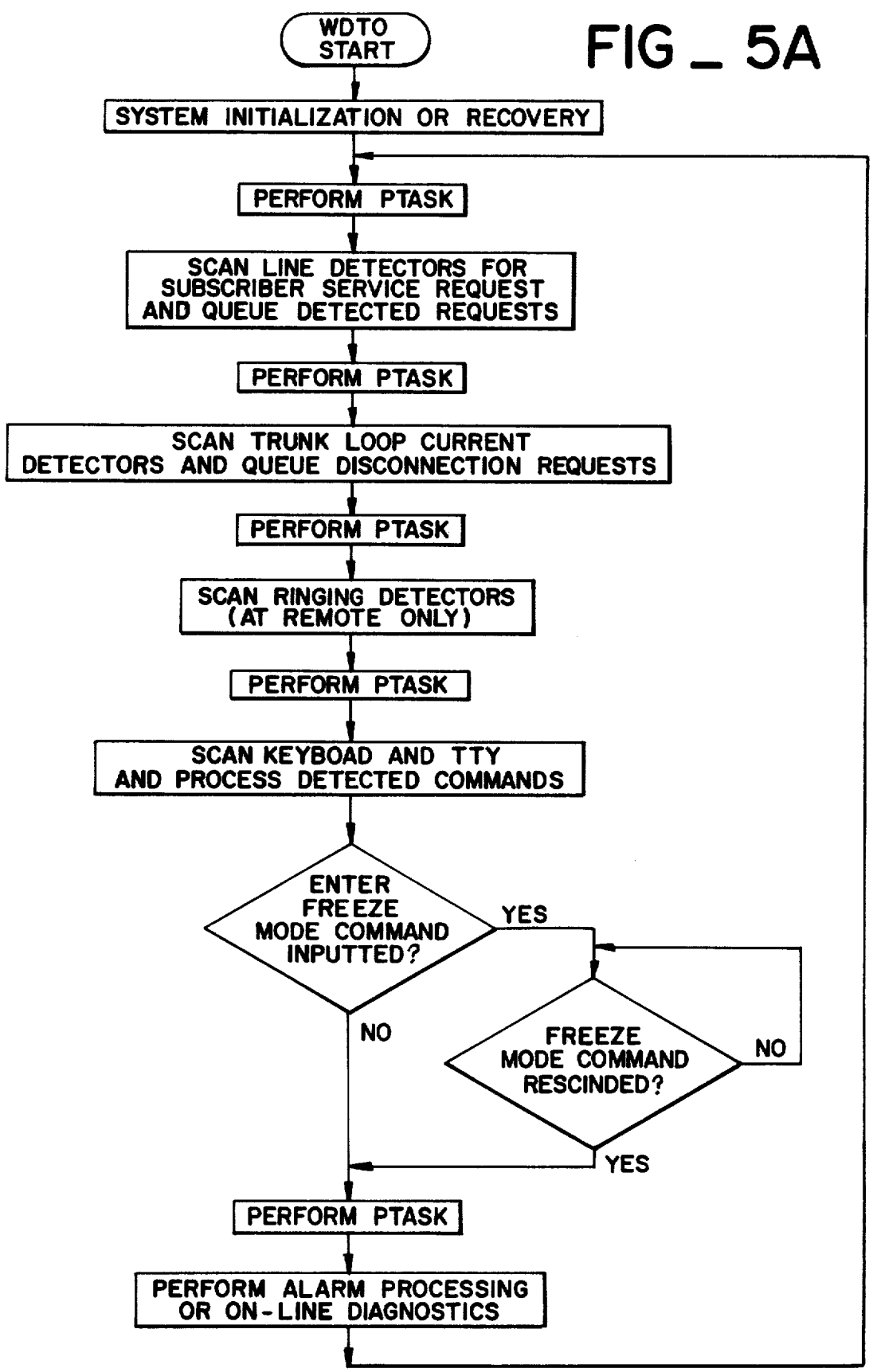
FIGS. 5A and B illustrate a flow diagram of the control program executed by the microprocessor unit of FIG. 2.

The line concentrator switching system 8 is illustrated in block diagram form in FIG. 1. The concentrator 8 is composed of a central office terminal (COT) 10 and a remote terminal (RT) 20. A service request originating either from the central office (CO) 2 or from a remote subscriber 4 is processed in virtually the same way by either terminal except for minor variations to be described herein. Therefore, referring to the remote terminal's operation as an example, the processor common control (PCC) 22 regularly scans the subscriber lines S(1)–S(N) connected to RT 20 for detection of the next concentrator 8 system service request. Circuitry in a line interface 28, accessed and controlled by the PCC 22, enables this process.

During the scanning process, a data link between the remote terminal PCC 22 and the central office terminal PCC 12 is maintained if an idle trunk exists. If no idle trunks are available, the PCC's must wait until a trunk goes idle before interterminal communication over a data link can be reestablished. Note that a data link path is not needed by the concentrator 8 if all trunks are busy, since no new switching can occur until a trunk goes idle.

The content of data link communication, if no requests for service are detected, consists usually of just the comparing by each terminal of the other terminal's status. Note that the time interval between the sending of a message and the reception back of a reply and the times available between segments of messages are when the terminal does its scanning for new service requests and any other routines needing to be performed, so that it is ready to respond when the next message time occurs.

When a service request is detected by the PCC 22 as described above, it sends to the other terminal this fact, and including the selected switch path and trunk chosen by the PCC 22 to complete the requested call path. This is assuming a data link already has been established. If the other terminal has not received an error free message, a request that the message be retransmitted is sent back. If the message is error free, both of the PCC's switch off of the trunk used as the data link and enable the line requesting service to be switched onto this trunk or onto another chosen trunk depending on traffic load parameters. Both terminals then switch to the next idle trunk to attempt the reestablishment of the data link on this new trunk. Stored trunk status tables in each PCC 12, 22 are what the terminals use to find which trunks are idle and which are presently in use. If more than one idle trunk exists, an algorithm is performed by each terminal to choose which of the available trunks will be used to reestablish the data link.

The data link switching circuits described above and trunk status indicators comprise the trunk interface 26 in the RT 20 and the trunk interface 16 in the COT 10. Ringing detectors 34 are also provided at the RT 20 to verify a ringing signal from the COT 10. The switching of a line requesting service to an available trunk is performed in a two-stage switching matrix 24 in the RT 20 and in an identical switching matrix 14 in the COT 10. Lastly, battery means 30 are also included at the RT 20 to provide auxillary power automatically switched in during power failure. Such failures are more likely at a remote terminal since they tend to be located in rural and developing areas. Battery means 30 is rated to provide eight hours to emergency power.

FIG. 2 illustrates, in block diagram form, the processor common control unit of both terminals, i.e. PCC 12 and 22. The processor common control comprises a microprocessor unit 60 controlled by a control cycle program stored in a read only memory (ROM) 74. A ROM is used because the control program is the permanent system controller of the terminal. No change in the control program is desired or normally possible once the ROM has been modified to reflect the steps of the control program therein. The PCC also includes a random access memory (RAM) 76 which is used to store the current status of lines and trunks in the concentrator 8 system and to store other subscriber service data. The RAM 76 is also used for the storage of any system operating errors detected and for the storage of trunk service requests, if more than one request is pending at a given time. Access to the ROM 74 and the RAM 76 is via a bidirectional processor bus 90 for the outputting of data to the RAM memory and via an input data multiplexer 88 for the inputting of data to the microprocessor 60 from the RAM and ROM memory units. An address register 80 loaded by the microprocessor 60 via the processor bus 90 defines what storage location in memory 74, 76 is accessed by the microprocessor 60.

The PCC 12, 22 also contains various input and output ports 62, 66 and 70 and associated port selection registers 64, 68 and 72 for the outputting of data and control signals and for the inputting of data and the monitoring of control signals, as will be described in more detail herein.

Referring again to FIG. 1, before data from a PCC can be put out on a trunk for transmission to the other terminal's PCC or received from that other terminal, it must pass through the data link transmitter/receiver (XMTR/RCVR) 40 in the COT 10 and the data link transmitter/receiver (XMTR/RCVR) 50 in the RT 20. These units are needed to slow down the data, because the trunks are not designed with the ability to transmit information at the speed that the PCC operates at. Only voice grade signals can be transmitted thereon. The data link data is formatted as a serial bit string which is transmitted via an FSK (frequency shift keying) coding system. The XMTR/RCVR 40, 50 accepts a plurality of parallel digital 8-bit words from the PCC 12, 22 and converts these words into a serial data bit string. The XMTR/RCVR 40, 50 further performs the opposite function for messages received by it from the other terminal. In the present embodiment, each message takes 40 milliseconds (ms) to complete. Further details on the operation of the XMTR/RCVR 40, 50 is provided in the Data Link section of the specification hereinbelow.

As illustrated in FIG. 2, interaction by maintenance personnel with the line concentrator system is via a 4-digit hexadecimal display 106, a front panel keyboard 110, a teletype interface 108, and various alarm circuits in an alarm and power unit 104 which exist both at the COT 10 and at the RT 20. Maintenance of the concentrator system is made easy by diagnostic routining, via programs stored in the ROM 74, and by system maintenance monitoring, via the maintenance monitor 100, both of which are periodically automatically performed by each PCC and which may also be requested to be performed by maintenance personnel. Any errors discovered as a result of this process are analyzed and diagnosed by the PCC, such that maintenance personnel will be directed to predetermined corrective procedures. The errors detected, including the PCC's diagnosis of the errors, is stored in trouble number codes to await readout by maintenance personnel. Operational errors detected by the PCC 12, 22 independently of the above routines are also stored in trouble number format. Note that these maintenance routines are designed to operate so that they do not interfere with normal concentrator 8 system operation.

Initialization of stored system status during system start up, and reinitialization of stored system status, also involves special provisions. When the concentrator 8 is initially turned on, both terminals establish data link communication on an arbitrary trunk. If data link communication is successfully established on this first trunk, or if after an arbitrary number of attempts, communication is not established over this trunk, each PCC 12, 22 records this fact in its trunk status table and then continues on to a next trunk to attempt communication on this new trunk. This procedure is repeated until all trunks have been checked and their operational status recorded in trunk status tables for future reference. These tables are stored in each terminal's respective RAM. With the data link established on the last trunk checked by the PCC 12, 22, the PCC's 12, 22 begin their respective scans for subscriber requests for service, while continuing to communicate, one with the other, as was briefly described above.

If either terminal loses its line and trunk status information due to a power failure, subscriber lines that are presently coupled through the concentrator 8 system are able to continue to be so, since magnetically latching relays are used in the concentrator switching matrix 14, 24. These relays do not require any power to retain their present state. When power is returned to the terminal that has lost its data, it indicates to the other terminal that is has resumed operation and that it is in need of system status updating. With the other terminal storing a duplication system status, knowledge of the position of each switch in the switch matrix 14, 24 in both terminals is retained. Thus the terminal that has not lost its power has the ability to transmit this system status data over the data link to the requesting terminal, to thereby automatically bring this terminal back into an operational state.

If both terminals lose power, system status is irretrievably lost, i.e., neither terminal knows which subscriber line is switched onto a given trunk. Therefore both terminals will clear down their line and trunk relays to insure starting at a known state.

The concentrator 8 system further provides for subscriber line or system trunk lockout. If the PCC 12, 22 cannot establish data link communication on a given trunk, or if maintenance personnel have manually inputted to the PCC 12, 22 that a trunk be taken out of service, then the trunk is locked out from being used again by storing these occurrences in the trunk status RAM 76 memory location corresponding to that trunk. If the PCC 12, 22 cannot establish or maintain data link communication on a given trunk then that trunk status word is marked system maintenance out of service (MOS). Attempts to use this trunk for communication will be automatically made when all other trunks are busy. Line lockout can, however, only be done manually by maintenance personnel. Note that no E-coils need to be pulled, as was required in older electromechanical systems. To manually lockout either a line or a trunk, one need only load in the number of the desired line or trunk to be locked out into the PCC 12, 22 via keyboard 110 along with the lockout command. This lockout ability is needed especially during bad weather conditions, when lines shorting together look to the concentrator 8 system like a service request that never goes away, thus tying up the system as a result. In addition, with the PCC 12, 22, the concentrator 8 can automatically bring the malfunctioning line back into service if it detects that the short has gone away. This function is entirely control program initiated. Reference is suggested to the System Operation section of this specification for further details regarding the above and regarding the various other command functions available for externally controlling concentrator 8 operation.

A. The Processor Common Control

As impliedly stated above, the processor common control, both in the COT 10 and in the RT 20, normally controls virtually every aspect of concentrator 8 system operation. Relay switching commands, trunk status storage operations, subscriber line scanning, in general almost all functions are controlled in the present invention by these PCC units 12 and 22. Since this aspect of the concentrator 8 is the most pervasive, the main subsystems of the PCC 12, 22 will be discussed separately below.

(1) The Microprocessor and Watchdog Timer

As shown in FIG. 2, the microprocessor 60 is the main manipulator of data and normally the controller or supervisor of all aspects of the processor common control 12, 22. All input data passes through the microprocessor 60 and all output data, control, and memory address information is generated through this unit. A typical type of microprocessor includes the INTEL 8008 8-bit parallel word microprocessor unit, as described in the INTEL 8008 User's Manual, Rev. 4, November 1973, with some additional control circuitry as described below.

Referring to FIG. 3, the microprocessor 60 communicates over 8 bidirectional lines on the processor bus 90. Time multiplexing of the processor bus 90 allows control information, addresses and data to be transmitted between the processor and external subsystems on this bus. The microprocessor 60 is controlled internally by an instruction set of 48 instructions, including data manipulation, binary arithmetic, and jump-to-subroutine instructions. Microprocessor 60 control is also obtained via the Watchdog Timer Output (WDTO) line, discussed below. Other devices may be controlled by the processor with the use of the S0, S1, S2 and SYNC output control lines generated by the INTEL 8008. In the present embodiment S0, S1, S2 and SYNC are decoded in the state decoder 212 to create in a conventional manner, many of the microprocessor 60 control signals. These include the control signals defined as the OE, $\overline{\text{IN}}$, $\overline{\text{EN1}}$, $\overline{\text{EN2}}$, OUT 1, OUT 2, and WRITE ENABLE ($\overline{\text{WE}}$) signals.

The various registers in the INTEL 8008 include the input/output register 202, the arithmetic and logic unit 204, which implements the addition, subtraction and logic operations called for by the instruction set, and the accumulator, memory, and program counter registers 206, which among other functions provides temporary storage for data being operated on and temporary storage for program and subroutine addresses.

The instruction decode and control unit 208 provides the logic for manipulating the registers 202, 206 and the arithmetic unit 204, based on the type of instructions read in and decoded by the INTEL 8008. The timing is regulated by a clock generator 210 that operates from an external two-phase clock 86 (see FIG. 2).

It should be noted that in the present embodiment, the two-phase clock 86 comprises two crystal oscillators, wherein one is the backup of the other. Therefore, if one oscillator has a frequency variation that is more than minor, circuitry in the two-phase clock 86 unit automatically switches in the other oscillator.

The Watchdog Timer (WDT) 82 is a counter that generates timing pulses by counting increments of time defined by an input clock pulse from the two-phase clock 86 unit. These timing pulses are used as a microprocessor 60 programming aid. The longest time counted by the WDT 82 is 472 ms. This time interval is used as the WDTO signal that generates a microprocessor 60 INTERRUPT, to thus initialize or reinitialize the microprocessor 60 and restart the control program. The WDT 82 is normally periodically reset by the microprocessor 60, so that it never counts up to the 472 ms time interval, and thus never generates an INTERRUPT. Only when the microprocessor 60 gets stuck, for example performing an erroneous program task, or if it has halted, will an INTERRUPT occur. This feature, therefore, automatically frees the system at least temporarily from microprocessor 60 or control program malfunctions. Also, on power start-up, since the microprocessor 60 has not begun operating, the WDT 82 is never reset but is allowed to count until the 472 ms has elapsed, creating a WDTO signal and a resultant microprocessor 60 INTERRUPT, thereby automatically starting up the system without the need for any maintenance personnel interaction. More about the operation of this circuitry is given below in the System Initialization section of this specification.

As shown in FIGS. 2 and 3, the state decoder 212 takes the S0, S1, S2 and SYNC outputs of the INTEL 8008 along with three lines (A12–A15) from the address register 80 (illustrated in FIG. 2) and the SYNC-$\phi$2 line to generate the above-listed output signals. The OE and $\overline{\text{IN}}$ signals control the input data multiplexer 88, whose function is to input data to the microprocessor 60 either from one of the eight input ports 62 or from the ROM 74 or RAM 76. The $\overline{\text{IN}}$ signal is also used to strobe the input port select 64 to enable data from the desired port to connect through to the input data multiplexer 88 input line. The OUT 1 and OUT 2 signals control whether the latching output ports or the non-latching output ports obtain and output control data from the microprocessor 60. OUT 1 strobes information into eight latching output ports, having a plurality of output lines per port and OUT 2 strobes information into the eight non-latching ports with each port having only one line. The final signal is the WRITE ENABLE ($\overline{WE}$) signal. This signal tells the RAM 76 whether the microprocessor wishes to read data out of or load data into the RAM 76. A detailed understanding of how the above-described signals are produced by the state decoder 212 is not necessary to appreciate the present invention. Reference to the INTEL 8008 User's Manual is suggested if further information on the specific control circuitry necessary to provide the described signal operations is desired.

(2) The RAM Subsystem

A typical random access memory (RAM) and memory addressing scheme is shown in the system block diagram of FIG. 2. In the present embodiment, the RAM 76 has a storage capacity of 2048 eight-bit words. Memory addresses from the microprocessor 60 are coupled by the processor bus 90 to a sixteen-bit address register 80. Control signals CLR, $\overline{EN1}$, and $\overline{EN2}$ from the microprocessor 60, strobe an address into the address register 80 as two eight-bit bytes to create the sixteen-bit address word. In the present embodiment, only 12 of these sixteen address bits are used in addressing the RAM 76. The address register 80 is required to retain the address desired, since the processor bus 90 is also used in a later part of the microprocessor 60 memory cycle as a data bus, wherein data is either received by the microprocessor 60 or sent out from it to be stored in the RAM 76.

During a read cycle, the RAM 76 outputs data to the microprocessor 60 on the memory data bus 92. During such a read cycle, the data is coupled to the microprocessor 60 from the memory data bus 92 through an input multiplexer 88, which is used to give the microprocessor 60 the choice of inputting either RAM 76 or ROM 74 memory information or data from one of the input ports 62. The output from the input multiplexer 88 is coupled to the microprocessor 60 by the bidirectional processor bus 90. Data is inputted to the RAM 76 for storage directly from the microprocessor 60 by means of the processor bus 90. As mentioned above, the RAM 76 is told whether or not the microprocessor 60 wishes to write data into the RAM 76 or read data from the RAM 76 by means of the WRITE ENABLE ($\overline{WE}$) line, as illustrated in FIGS. 2 and 3. When information is to be read from the RAM 76 to the microprocessor 60, only the address need be given, the $\overline{WE}$ line is not strobed. Writing information into the RAM 76, however, does require that the $\overline{WE}$ line be strobed.

As shown in FIG. 4, the RAM 76 is organized into different sub-blocks, including blocks of storage space for trunk and switching matrix status, a scratch pad for temporary storage of numbers being operated on, a queue for the storage of detected service requests that have not yet been switched through, and various program pointers for enabling the microprocessor 60 to return to routines that have been temporarily stopped in order to perform routines of higher priority.

(3) The ROM Subsystem

A typical, non-destructive, read only memory (ROM) 74 and memory addressing scheme is also shown in the system block diagram of FIG. 2. The ROM 74 is addressed in the same way that the RAM 76 is addressed, except instead of using just the address register 80, the ROM 74 additionally uses a ROM chip select register 78. The addressing scheme for both the ROM 74 and RAM 76 memories is set up so that every memory location, whether it be in the ROM 74 or the RAM 76, is uniquely addressable by the microprocessor 60.

The ROM 74 contains all the stored programs for the line concentrator 8. Details of this control cycle program will be discussed in the System Operation section below. In the present embodiment, the ROM 74 has a capacity of over 14,000 words. It is further designed to enable expansion of memory capacity when needed. Stored in the ROM 74 is the concentrator 8 system control program for use by and control of the microprocessor 60. The advantages of ROM controlled systems is that once data or instructions are stored in the ROM, the information cannot be affected by system power failure or processor re-programming, whereas information in a RAM is alterable in these ways. Note that ROM's can be initially programmed only by special devices at the factory, and although some ROM's have the capability of being re-programmed, this also can only be accomplished by special devices which are not a part of the present invention.

The ROM 74, if addressed by the microprocessor 60, outputs data onto the same memory bus 92 as does the RAM 76. This data is coupled to the processor 60 via the input data multiplexer 88 and processor bus 90. The addressing scheme for the ROM 74 is slightly different from that of the RAM 76, in that the address register 80 only feeds the first eight bits of address directly to the ROM 76 for word selection, while four additional address bits (e.g. A8–A11) are coupled to the ROM chip select register 78. In the present embodiment, the register 78 comprises a plurality of chip select registers, one each on each memory board containing ROM chips. The register 78 functions to selectively enable the addressing of a given ROM chip based on the state of address bits A8–A13. Each ROM chip presently contains 256 eight-bit words, so that address bits A$\phi$–A7 are used to select a specific word location on the ROM chip selected by the register 78. It is within the scope of the present invention to incorporate ROM's of higher bit density as they become available, e.g. ROMs having 2024 eight-bit words.

(4) Input/Output Devices

As shown in FIG. 2, there are eight latchable registers of eight bits each that comprise the output ports 66, and eight strobing output ports 70 of one bit each. These output ports 66, 70 communicate control functions and data to the respective devices, corresponding to a given port, that the microprocessor 60 wishes to access. The ports 66, 70 connect to subsystems both within the PCC 12, 22 and external to it. The means for choosing which port passes information to its respective subsystem comprises two output port select units 68, 72. The port select 68 selects one of the eight latching output ports 66 for information transfer, and the port select 72 selects one of the eight strobing ports 70 for information transfer. Each port select unit 66, 72 decodes three input lines (A9–A11) from the address/data bus 92 into eight output lines for individual selection of one of the eight output ports. The OUT 1 and OUT 2 signals, originating from the microprocessor 60 also input to the port select units. Signal OUT 1 enables operation of port select 68, and signal OUT 2 enables operation of port select 72. The output port 66 latchable registers remain in a chosen state until microprocessor 60 modification at a later time. The strobing output ports 70, however, only stay on as long as the port select pulse OUT 2 remains on.

Each output port 66 passes up to eight bits (Aφ-A7) from the address/data bus 96 out to the selected device. Each output port 70 only passes one bit per port. In the present embodiment, since the output port 70 is non-latching, the only circuitry existing in this unit is a buffer gate connecting the line selected by the port select 72 and the selected device. For further details on the operation of these units, consult the System Operation section of this specification.

The various units that are accessed and controlled via the output ports 66 include: a switch matrix select unit 102, an alarm and power unit 104, and a teletype interface 108, which are units within the PCC 12, 22; and include the line interface 18, 28, the trunk interface 16, 26, and the XMTR/RCVR 40,50, which are units external to the PCC 12, 22. The output port 66 also includes one port for the PCC output data bus 98, and one port for maintenance monitor 100 control. In the present embodiment, all of these above-mentioned ports 66 contain eight output signal paths except for the XMTR/RCVR 40, 50 which needs only six, the teletype interface 108 which only needs three, and the maintenance monitor 100 which also only needs three.

The various units that are accessed and controlled by the output ports 70 include the display 106 (one line), the WDT 82 reset (one line), the teletype interface 108 (two lines), and the XMTR/RCVR 40, 50 (four lines).

The PCC 12, 22 also contains eight input ports 62 of eight bits each. These input ports 62 receive information from both internal PCC 12, 22 subsystems and from subsystems external to it. The output bus of the input port 62 is the input port data bus 94 which couples selected inputted information to the input data multiplexer 88, and thereby to the microprocessor 60. The means for selecting which input port receives and passes information to the input port data bus 94 comprises an input port select 64. This unit operates similarly to the output port select 68 in that it decodes three input lines (A9-A11) from the address/data bus 96 into eight output lines for individual input port selection.

The various units that input data via the input ports 62 include: the keyboard 110, the maintenance monitor 100, and the teletype interface 108, which again are internal to the PCC 12, 22; and trunk interface 16, 26 status, line interface 18, 28 status, an input data bus, an output data bus (fed back from an output port 66), and XMTR/RCVR 40, 50 status and data, all of which originate from sources external to the PCC 12, 22.

Turning now to the operation of the various input-/output subsystems mentioned as being internal to the PCC 12, 22, reference is first made to the switching matrix select 102. This unit merely takes the eight output port lines selectively inputted to it, under the control of the output port select 68, and decodes these into 32 lines for switching matrix 14, 24 selection, as will be further described in the Switching Matrix and Matrix Decode section of this specification.

The alarm and power unit 104 turns on audible and visual alarm indicators, including a front panel alarm light, to indicate to maintenance personnel that the PCC 12, 22 has detected a system malfunction such as a power failure. The fact that an alarm has occurred is then fed back to the microprocessor 60 via an input port 62. Note that as seen in FIG. 1, backup power can be provided by means of battery 30. The power unit 104 would automatically switch in this backup power if power normally available at the remote terminal was interrupted. The battery 30 is large enough to provide power for up to 8 hours.

The display 106 is a four-digit hexadecimal read-out with associated drive circuitry. Information to be displayed is transmitted from the microprocessor 60 directly to the display 106 via the address/data bus 96 on lines Aφ through A6. The low order four bits (Aφ-A3) indicate the numeral or letter desired and the next three bits (A4-A6) selects which of the four digits will obtain the new data. A control signal from the output port 70 enables the display 106 to accept this data. The display 106 is used to confirm receipt of commands manually inputted to the concentrator terminal. The microprocessor can also output system status and other data or request the user to input additional data via the display 106.

The display unit 106 is further used to display error information discovered by the PCC 12, 22. This information is in the form of trouble numbers. The trouble number is coded by the microprocessor 60 to allow maintenance personnel to look up the number in a trouble number dictionary for an explanation of what type of error has been detected and what the suggested repair procedure is. The microprocessor 60 and control program perform the system error analysis that makes this possible (see the System Operation section below). The first trouble number of a detected error automatically appears on the display 106. Subsequent trouble numbers are stored in the RAM 76 for later readout by maintenance personnel.

As mentioned above, the display 106 also is capable of displaying other data. Such data includes subscriber line traffic information, or the contents of specific memory words in the RAM 76. Maintenance personnel can even enable the display to continuously read-out a word from memory to enable the monitoring of data stored at that memory location as it changes. Maintenance personnel can control what is displayed by means of the keyboard 110 or the teletype 108 as further described below.

The keyboard 110 is the main means of maintenance personnel input to and control of the line concentrator 8 system. Using the keyboard 110, maintenance personnel can request that system diagnostics be performed, request that other special command routines be performed by the microprocessor 60, e.g., request a traffic analysis routine, request system status information, tell the PCC 12, 22 to lockout a line if it is malfunctioning, force the switching of a particular line to trunk path, and other functions.

The keyboard 110 is a standard telephone push-buttom unit whose outputs are digitized and coupled to one of the input ports 62. Each time a push-button is pressed, the number is displayed on the display 106 to verify that the PCC 12, 22 has correctly received that input. Access to the PCC 12, 22 via the keyboard does not interrupt system operation. The microprocessor 60 fits in any keyboard request within normal system cycle periods. The microprocessor 60 only acknowledges maintenance personnel requests when it is finished with higher priority subscriber service operations.

In the present embodiment, once a command has been entered on the keyboard 110, if an "A" appears on display 106 it indicates that the command is not accepted. A "B" indicates that the system is presently busy with call processing. A "C" indicates that the command has been successfully completed. An "E" indicates that a keyboard 110 data entry is expected. Finally, an "F" indicates that the system is in a freeze mode. In the freeze mode, the system will not process new calls but will continue calls in progress. In this mode, certain system modules may be replaced without requiring system power shut-down.

A teletype interface 108 enables communication to and from the PCC 12, 22 to be performed using a standard teletype unit with attached paper tape reader. This teletype interface 108 is relatively standard, comprising mainly a teletype clock and a universal asynchronous transmitter and receiver (a UART, e.g. a TMS 6011 as made by Texas Instruments) for input/output to and from the teletype and control thereof. A teletype connector is provided at each concentrator 8 terminal to simplify connection of a teletype thereto. A person reasonably skilled in the art should be able to construct such a unit without difficulty.

One advantage of having teletype capability in a concentrator 8 system is that it is easy to remotely hook up such a teletype unit. That is, it allows the teletype to operate at a distance from the concentrator 8 system, with connection to the concentrator 8, for example, establishable over an independent telephone line using a modem. This would enable not only the remote monitoring of the concentrator 8 system but remote control as well. For example, multiple concentrator 8 systems could be monitored at a common location for traffic studies, etc., or be used to disable a particular subscriber's access to the concentrator 8 system due to that subscriber's failure to pay his bill while yet still allowing such a subscriber to receive calls through the concentrator system. It should be noted that since the microprocessor 60 and control program assert virtually total control over the PCC 12, 22, the possibilities herein exemplified should not be limiting, except to the extent that program size is limited in the absolute.

Finally, the concentrator 8 input/output subsystem includes a maintenance monitor 100. The maintenance monitor 100 performs the function of wrapping around the data from all output ports, except for the output data bus 98 which has its own input port 62, and connects this information to one of the input ports 62 for separate microprocessor 60 checking of all output port 66 states. The monitor 100 function is performed by means of a multiplexer within the maintenance monitor 100 having six eight line input channels and one eight line output. Note that the lines marked A through D indicate the various port wrap-arounds that exist. The monitor 100 multiplexer is controlled by three lines originating in the microprocessor 60 and fed to the maintenance monitor 100 on lines "E" via one of the output ports 66.

With regard to the other control and data lines which are either coupled from external systems to the PCC 12, 22 input ports 62, or outputted from ports 66, 70, these signal lines will be discussed as each corresponding system is discussed hereinbelow.

B. The Line Interface

(1) Remote Terminal Line Interface

The remote terminal 20 line interface 28 provides one function, that of off-hook detection. Off-hook is defined as a subscriber loop closure (request for service) indicated as a resultant current flow of at least 10 ma. Current detected in the range less than 10 ma is defined as indicating an on-hook state. It may be easier to understand these terms if one pictures a subscribers request for service as his act of taking his phone off of its cradle or hook in order to make a phone call and the replacing of the phone back on the hook when the call is finished. There is, therefore, one off-hook detector for every subscriber line serviced by the line concentrator 8 remote terminal 20.

FIG. 10 illustrates a typical embodiment of an off-hook detection scheme at a remote terminal 20. In the present embodiment, there are sixteen lines (A-X) serviced by each line interface 28 board, so that a system with 64 subscriber lines would contain four such boards. The use of 16 circuits per line interface board allows for flexibility in concentrator 8 system subscriber servicing size. Note that each subscriber line really is two lines, the tip and ring lines required for telephone operation in the present embodiment. The signal that controls which line interface board 28 is enabled is the OE(Y) signal, wherein Y equals the number of interface boards in the system. This signal is coupled from the PCC 22 to the line interface 28 boards via an output port 66. Four line interface 28 boards, therefore, require four signals, OE1-OE4, for individual selection of each board. The microprocessor 60 selects a given OE(Y) signal by loading a single bit from address bus 96 into the output port 66 selectively enabled by the port select unit 68. As mentioned above, one output port is used only for enabling commands to selected line interface boards.

Referring again to FIG. 10, a relay L4 keeps the subscriber line hooked up to an off-hook current detector L2 whenever the associated subscriber line is idle. After an off-hook condition has been detected, relay L4 enables the current detector L2 to be switched out of the subscriber's loop by the PCC 22. Note that the subscriber line path is not switched by the line interface 28, i.e. the continuity of this path stays the same. The relay L4 only allows the off-hook detector to detect the electrical state of the subscriber line. Note that there is no automatic on-hook detection for the purpose of reconnecting the off-hook current detector to the subscriber line. As a result, the PCC 22, after it has detected by other means that a subscriber's use of the line has ended, must access the line interface 28 board to release the corresponding relay L4.

The PCC 22 receives subscriber line off-hook detector status one line at a time. The PCC 22 controls this status read-out process by means of four output data bus 98 lines (0-3). These four data bus 98 lines are inputted to a line status multiplexer L30, which uses the state of the four lines to control which of the sixteen off-hook detector status lines on a given board is read-out on an LS(Y) line. No OE(Y) signal is required for line status selection. A separate LS line from each line interface board (LS(1)-LS(4)) connects to one of the PCC 22 input ports 62.

The PCC 22 controls which of the L4 relays on each board is actuated and released also by means of the output data bus 98 lines (0-3). These lines are decoded into sixteen outputs in the L32 and L34. The decision of whether relay L4 actuation via L32, or relay L4 release via L34, is accomplished, is controlled by the F$\phi$ and F1 lines. Recall that each board is selected by a separate OE(Y) strobe line for relay L4 control. Gates L40 and L42 enable this F$\phi$, F1 relay state selection process, allowing either the F$\phi$ or F1 signal to pass only to the chosen relay control decoder L32 or L34 on the one board that has its OE(Y) line strobed.

(2) Central Office Terminal Line Interface

The central office terminal 10 line interface 18 is similar in function to the RT 20 line interface 28 in that it detects subscriber requests for service incoming from the C.O.2 in this case, and enables this information to be accessed by the PCC 12. The type of detection used and the resultant switching performed may not be the same, however. Although a two wire detection line interface similar to that in the RT 20 may be used depending on the needs of the C.O.2, normally, a three wire system, including a "C" lead, is used. In such a three wire system, detection is different in that the detector for the COT 10 line interface 18 is not switched in and out of the line path but remains continuously attached. Also, the concentrator 8 system, by means of a reorder signal in the line interface 18, is enabled to indicate to subscribers having calls incoming via the C.O.2 that all paths through the concentrator 8 are in use. This signal is also designated as the All Trunks Busy signal (ATB). It therefore indicates to the subscriber that he should hang up and try again later.

FIG. 11 illustrates an embodiment of one of the three wire line interface 18 P.C. boards. As shown in FIG. 11, a plurality of subscriber lines (A)-(X) are sensed for service requests. In the present embodiment, sixteen lines are serviced on each line interface 18 board, with two or three wires on each line. Consequently, for example, four boards would be required to cover the servicing of 64 incoming lines.

In the more common three wire system, the COT 10 line interface 18 performs detection of incoming calls from the C.O.2, i.e. off-hook detection, by sensing changes in the "C" or sleeve lead status. Subscriber off-hook is defined in this case as being a "C"-lead voltage that is at least seven volts more positive than the C.O.2 battery voltage, which is nominally (−)50 volts. In the present embodiment, a conventional voltage level detector comprises the C-lead detect L54. When an incoming call is detected thereby, the detector L54 outputs a status signal to a line status multiplexer L64. This multiplexer L64 selectively takes one of the sixteen separate C-lead status signals and outputs it on an LS(Y) line for PCC 12 input via an input port 62. Since there are four line interface 18 boards, for example, in a 64 line concentrator 8 system, the PCC 12 would input four status signals, LS(1)-LS(4), one from each board. The PCC 12 controls which of the sixteen status lines is outputted by the L64 by varying the state of the four output data bus 98 lines (bits 0–3) that access this multiplexer L64. Note that instead of a C-lead detection as herein described, a two-wire line interface could be used for those C.O.'s that do not use threewire control. Such an interface would be similar to the RT 20 line interface 28 described above.

A relay L50 switches in the reorder signal, mentioned above, whenever all trunks or line links i.e. paths in the switch matrices, are busy. The reasons for the occurrence of these busy conditions will be discussed below. Refer to the Switching Matrix section for discussion of line link busy, and to the Trunk Interface section for discussion of trunk busy. The reorder signal is created in a reorder generator L60 which may be external to the system, and consists of a 120 impulse per minute tone that, when switched onto the subscriber's line, is heard by the person attempting to complete the call. Since the tone resembles a standard telephone busy signal but at a faster repetition rate, the caller should realize that to get his call completed he must hang up and re-attempt to make the call. The relay L50 is driven by a standard relay driver circuit L52 controlled by a relay select decode L62. The decoder L62 selects which of the sixteen relays L50(A)-(X) on the board are to be actuated. The decoder L62 is controlled by four lines inputted to it from the PCC 12 on the output data bus 98. The four lines are output data bus 98 bits 4–7.

The PCC 12 controls which board is selected and whether relay selection or line status is performed on the selected board by using the OE(1)-OE(4) lines to select the board, and the Fφ and F1 lines to select the function performed on the board. In the present embodiment, at the COT 10, Fφ enables relay L50 selection via AND gate L70 and F1 enables line status output from the multiplexer 64 via AND gate L72.

Finally, when a subscriber line goes idle after call completion or due to reorder, the resultant subscriber C-lead state change back to (−) 50 volts is also detected by the C-lead detector L54 associated with that particular line. If the call was a reorder, the output of this L54 causes the reorder relay L50 corresponding to this line, to release, thus providing an automatic discussion of the reorder signal.

C. The Switching Matrix and Matrix Decode

FIG. 8 illustrates a typical configuration of 16×8 switch matrices S10 comprising one end of a line concentrator 8 system. For example, the first stage would switch 64 lines into 32 lines and a second stage would switch 32 lines into 16 lines for a total concentration of 64 lines into 16 lines (64×16). Two-stage switching networks of 128×32 and one stage switching networks of 32×8, among others, are also standard sizes. Both the COT 10 and RT 20 contain identical switching matrices 14, 24 and decode circuitry 42, 52.

Figure 9:
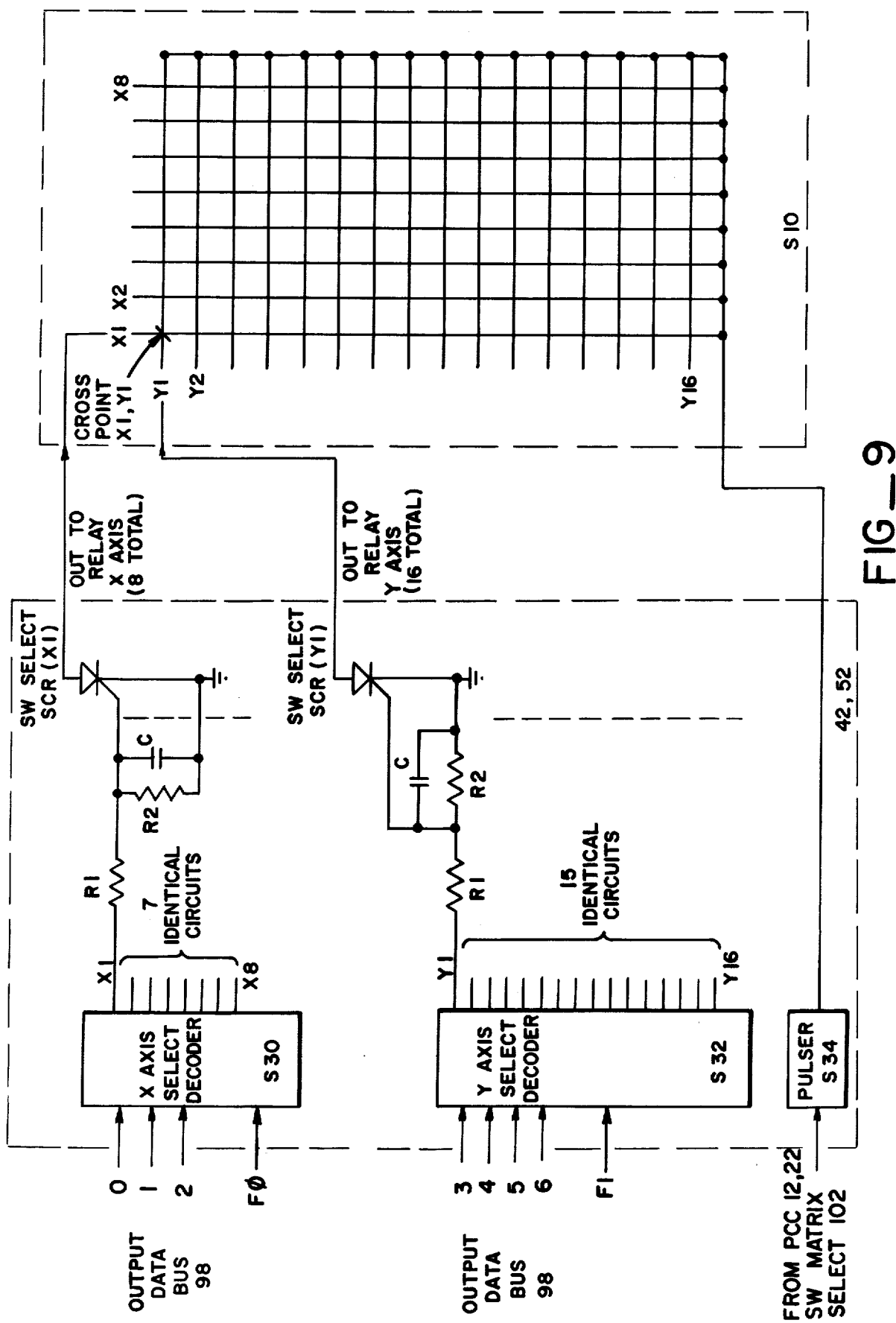
FIG. 9 illustrates the circuitry of one of the switch matrices of FIG. 8.

FIG. 9 shows the typical switch organization for a 16×8 switch matrix S10, with switch decode and pulser means 42, 52. Each 16×8 switch matrix S10 contains 128 separate relays, each one represented by a crosspoint as shown in FIG. 9. The relays are magnetically latching, two-pole reed relays. The contacts of these relays are sealed in glass tubes that are filled with inert gas. They are thus highly reliable in adverse operating conditions. Two-pole relays are used because two wires, and tip and the ring (as described in the Line Interface section of this specification) are always switched as a pair for each subscriber line as inputted from the line interface 18, 28. The eight concentrated output lines from each matrix S10 are coupled to the trunk interface 16, 26 described in the next section. Since the relays contain magnetically latching coils, once they are switched to a certain state they remain there until switched back. No power is required to maintain either an actuated or a released state. As can be seen, this arrangement automatically protects the switch path of calls that are in progress when a line concentrator 8 power failure occurs.

For simplicity, only the relay actuation cross-points are illustrated in FIG. 9. It should be noted that each line inputted to the 16×8 matrix S10 has the ability of being switched to any of the eight output lines. That is, each input line has eight unique relays attached to it, each one of which can attach this input line to a separate one of eight output lines. With eight relays tied to each input line, it is easy to see why a total of 128 relays are needed to provide full switching of 16 input lines.

The means for deciding which of the 128 relay actuation cross-points is actuated is determined by the switch decoder 42, 52. Each 16×8 matrix S10 has its own pulser and switch decode 42, 52. A switch matrix select pulse originating from the PCC 12, 22 switch matrix select unit 102 is used to select the desired one of the units 42, 52. Thus, only one matrix S10 is selected at a given time for relay switching. With six switch matrices needed to concentrate 64 lines into 16 trunks, as illustrated in FIG. 8, six separate select pulses are generated by the switch matrix select unit 102 of the PCC 12, 22.

Referring again to FIG. 9, in each switch decoder 42, 52, there is an X axis select decode S30 and a Y axis select decode S32. These units decode data inputted on the output data bus from the PCC 12, 22 on bits $\phi$–2 for the X axis and bits 3–6 for the Y axis. Decoder S30 has eight output lines, and decoder S32 has sixteen. They control which one of the eight X axes (X1–X8) and which of the 16 Y axes (Y1–Y16), is selected. The eight outputs of decoder S30 are fed to their respective X axis lines via eight SCR switch select circuits SCR (X1)–SCR(X8). As will be explained below, the decoder S30 output line selected by output data bus 98 bits $\phi$–2 causes only the one corresponding X axis line to be actuated. Similarly, the output line of decoder S32 selected by bits 3–6 determine, via a respective SCR (Y1)–SCR (Y16) line, only the one corresponding Y axis line to be actuated in the matrix S10. Thus, each matrix X, Y cross-point is separately accessible via the decoders S30, S32 based on which of the X and Y axis lines are selected.

The means for driving the specific SCR's and corresponding axes, as selected by the decoders S30 and S32, is performed by a DC current pulse generated by a pulser S34. This pulse is fed to all of the SCR's of which there are a total of 24 in each switch decoder 42, 52. Only the X and Y SCR's selected by the decoders S30 and S32 allow the pulse to be fed through to the switch matrix S10. Since only one cross-point corresponds to each combination of selected X and Y axes, only the one relay situated at this cross-point will be actuated when a DC current pulse is coupled onto these axes. No other relay will be actuated. As mentioned before, each set of X and Y axis decoders and their corresponding 16×8 switch matrix S10 is uniquely enabled by a switch matrix select signal generated in the PCC 12, 22. This select signal activates the desired pulser S34. and thereby a selected relay cross-point.

One feature of the present embodiment is that when a DC current pulse is applied to the selected X and a Y axis switch rows by the pulser S34, this pulse causes any relays on that particular axis, other than the selected cross-point relay, which were in an actuated state to be switched into a non-conducting or released state. This scheme thus provides for automatic disconnection of any erroneous switch paths that may have been set up in the past in the switch matrix S10, thereby guaranteeing that the switch path created at a selected cross-point is the only switch path created for each of the sixteen matrix input lines.

One problem with a finite number of switches in each switch matrix S10 is that if there is heavy demand for switch paths through a given matrix S10, e.g. a demand for more than 8 paths, some call requests can't be serviced. This is the phenomenon of line-link busy or, in other words, switch matrix S10 blocking. If eight of the 16 inputs to the switch matrix S10 are in use, no other lines can be switched through in that matrix. If such a condition occurs, a subscriber can only either wait on line until another line attached to the matrix S10 goes free, or hang up and try again. The microprocessor 60 provides an indirect solution to the blocking problem, in that it allows one to do traffic surveys which monitor the use made of given lines during a given period. Using such surveys, one can spread out heavy users, so that high use lines are not bunched together in any one switch matrix S10. Very high use subscribers might even be taken out of the concentrator 8 system entirely. More on this survey capability is given below in the System Operation section.

D. The Trunk Interface

The trunk interface 16, 26 provides interface circuitry between the switching matrix 14, 24 in each terminal and the trunks T(1)–T(n) which interconnect the COT 10 and RT 20, as shown in FIG. 1. The trunk interface 16, 26 provides two functions. As illustrated in FIG. 6, it includes non-latching relays T30. These relays function to switch data link signals onto the relay's respective associated trunk when a given relay T30 is actuated. The data link signal originates from one of the PCC 12, 22's and is received by the other, via corresponding relays T(30) in each trunk interface 16, 26.

In their normally closed state, the relays T30 create a conductive path between each given trunk and the switching matrix 14, 24. The normally open poles of these relays T(30) are tied in common with the data link signal path to the XMTR/RCVR 40, 50. Thus, to protect the concentrator 8 from having crosstalk between trunks via the trunk interface 16, 26 relays T30, the interface only allows one relay T30 to be actuated, i.e. switched to its normally open pole state, at any given time.

The trunk interface 16, 26 also contains loop current detectors T20 which function to detect whether a particular trunk is presently in use or idle. The main use of this loop current detection ability is to provide the PCC 12, 22 with a means of checking the trunk operational status, i.e. each detector can detect whether a subscriber line path switched through the concentrator 8 system is active and not malfunctioning.

As seen in FIG. 6, the PCC 12, 22 controls which of the relays T30 and loop detectors T20 are chosen via the present state of the output data bus 98 bits $\phi$–3. These bits are inputted to a loop current detector multiplexer T40 for selection of which loop detector status line is outputted on a trunk status line, a TS(Y) line, to the PCC 12, 22. The output data bus 98 bits $\phi$–3 are also inputted to a relay select decoder T42 which selects which relay on the trunk interface 16, 26 is to be actuated. The state of bit 3 determines whether the loop current multiplexer T40 or the relay select decoder T42 is actuated.

A trunk interface operate enable signal, a TIOE(Y) signal, strobes a relay actuation enable register T44 to load in and store the identity of the line selected via relay select decoder T42, for retaining the desired relay actuation selection once the output data bus 98 bits no longer contain relevant data. When the data link is to be switched to another trunk and the subscriber line switched onto the trunk presently in use as a data link, the updating of register T44 by the TIOE(Y) strobe performs this task. Again, this is because the relays T30 are non-latching. Thus, actuating a new selected relay automatically causes the relay previously selectively actuated by the register T44 to be released.

In the present embodiment, to ease modification of the size of the concentrator 8 system, the trunk interface 16, 26 circuitry is split up, such that eight circuits are contained on each board. Consequently, a total of two boards are needed in a sixteen-trunk system. Therefore, two separate trunk status lines, TS(1) and TS(2), are outputted to the PCC 12, 22 in a sixteen trunk concentrator 8 system, and the trunk relay operate enable strobe signal comprises two strobes, TIOE(1) and TIOE(2), for selecting a given trunk interface board. Also, there are 8 relays T30(1)-(8) and 8 loop current detectors T20(1)-(8) per board. Note that a light emitting diode T22 may be connected to each loop current detector T20, to provide a means for indicating to maintenance personnel the present status of each corresponding trunk. It should also be noted that since the trunk lines are bidirectional, in that they both transmit and receive information, the loop detectors T20 are designed to sense current flowing in either direction.

One drawback of any line concentrator system is that trunk blocking will occur if all trunks are in use and a larger number of subscriber call requests have been received. Therefore, as discussed elsewhere in this specification, traffic studies to determine who the heavy users are, provide again a valid means for determining if such users should be eliminated from the system.

E. The Data Link

The data link is the serial bit string means by which the central office terminal 10 and the remote terminal 20 intercommunicate. There are generally three types of messages transferred: general purpose messages; switch connection requests; and switch disconnection requests. The PCC 12, 22 decides what information is to be transmitted to the other terminal and relays this information in eight bit data word bytes to the data link transmitter/receiver (XMTR/RCVR) 40, 50. In the XMTR/RCVR) 40, 50, parallel-to-serial conversion of this eight bit word and FSK (frequency shift keying) translation is performed. The XMTR/RCVR 40, 50 generates a leader pulse for each message. It further generates a start pulse, a stop pulse, and a data parity check bit for each byte of data in the message, to insure that the data word is accurately transmitted. Each XMTR/RCVR 40, 50 also has the ability to receive FSK information and translate that into a parallel word for reception by the PCC 12, 22. Also included in the receiving circuitry are the circuits that check to make sure that the various flags and parity bits have been received in their proper form.

In the present embodiment, a data link message is formatted as a series of three bytes of data with a leader header pulse at the beginning of the message. To eliminate the need for a response from the terminal receiving the message as a verification of correct receipt of the message, the third byte is composed of an algebraic check-sum of the data bits transmitted in the first two bytes of the message. This check is in addition to the parity check generated for each byte of data. FIG. 12B illustrates a typical data link message with a leader pulse of 5-10 ms. A complete 3 byte message is transmitted in approximately 40 ms at 1000 baud.

The key device in the XMTR/RCVR 40, 50 for the performance of XMTR/RCVR 40, 50 functions is the UART DL 10 (a universal asynchronous data interface circuit). For further information on this device, consult the Texas Instruments data sheet for the TMS 6011 UART, published on Mar. 15, 1973. This UART DL 10 provides serial-to-parallel and parallel-to-serial conversion, the ability to operate at a variable baud rate, the ability to operate with different word lengths of up to eight bits per word, the ability to generate a stop bit and a parity bit, along with other diagnostic flags, and other functions.

An embodiment of XMTR/RCVR 40, 40 is shown in FIG. 7. When a PCC 12, 22 wishes to transmit data on the data link, it loads an eight bit data word from the A$\phi$-A7 lines into the UART DL 10 buffer register. It then loads this information out to the UART DL 10 parallel-to-serial converter by strobing the TBRL line via the PCC 12, 22 strobe output port 70. The UART DL 10 then automatically begins the parallel-to-serial conversion of this eight bit word. Timing is controlled by an input clock pulse.

A typical data word byte, as outputted by the UART DL 10, is illustrated in FIG. 12A. There are eight bits of data in each byte and three UART control bits for a total of eleven. The first bit is the start bit, then the eight data bits are transmitted. A parity bit for the eight data bits is then sent. Finally, a stop bit is sent to indicate the end of the byte.

To generate a complete data link message, as described above, first a leader pulse is generated by the leader generator flip-flop DL 42 as seen in FIG. 7. This pulse indicates to the terminal intending to receive the data link message, that the message is beginning. Prior to loading of the first eight bit UART DL 10 word for parallel-to-serial conversion, the PCC 12, 22 presets the generator flip-flop DL 42 to begin the leader pulse. This first pulse is coupled to the FSK generator by the OR gate DL 44. At the end of this leader pulse time, the TBRL line is brought high by the PCC 12, 22 which enables the UART DL 10 to generate a start pulse and begin outputting the first parallel data word as a serial bit string. The UART DL 10 automatically outputs a logic "0" start pulse, as shown in FIG. 12A, on the TRO line, which also resets the leader generator flip-flop. The start pulse lasts one clock time, after which the UART DL 10 begins its data transmission. The UART DL 10 serial bit string is then coupled through AND gate DL 40 and the OR gate DL 44 to the FSK generator, called the FSK encode DL 12, in the same fashion as the leader pulse. The TRE line locks AND gate DL 40 off when no word message is being transmitted by the UART. After all eight data bits have been outputted by the UART DL 10, a ninth bit indicating the odd parity of the previous eight bits is automatically generated by the UART DL 10 and outputted. Finally, a stop bit is generated to indicate to the other terminal's UART that the byte of data has been completely sent.

The UART DL 10 serial message is transformed into FSK signals in the FSK encode DL 12. In the present embodiment, the FSK signal is defined as being for logic "0" a pulse of 1000 cycles per second (cps), and for a logic "1" a pulse of 2000 cycles per second (cps). Therefore, data is transmitted as different frequencies shifted from one frequency to another frequency based on whether or not it is a logic "0" or a logic "1".

As shown in FIG. 7, the UART DL 10 message inputs to a gated oscillator DL 46 which actually generates the frequency shifting, based on whether the DL 46 input is a logic "1" or a logic "0". The gated oscillator DL 46 output is shaped into a square-wave in the square-wave regenerator DL 48, which then divides the frequency of the gated oscillator input pulse by two. This output is passed through a low pass filter DL 50 which generates a sine-wave from the square-wave input. The output of the DL 50 is coupled by the internal data link bus DL 90 and an isolation transformer DL 60 to the trunk interface 16, 26 to become the data link signal that is transmitted to the other concentrator 8 system terminal. The transformer DL 60 is merely an isolation transformer to aid in the protection of the XMTR/RCVR 40, 50 circuits.

Reception of a data link signal by the XMTR/RCVR 40, 50 comprises basically the reverse of the transmission process. The input FSK signal is first coupled through the isolation transformer DL 60 and the internal data link bus 90 to an FSK decoder DL 14, which decodes the data link signal into a serial bit string compatible for inputting to the UART DL 10. The FSK signal, upon entering the FSK decoder DL 14, is first passed through a band pass filter DL 20 to filter out any high and low frequency transients. The FSK signal is then coupled to a limiter DL 22 which squares up the signal. The output of the DL 22 is coupled to an edge generator DL 24 for insuring that a one shot DL 26 is activated at the proper time. The square-wave output of the DL 26 is passed through a low pass filter DL 28 to format this signal property for a comparator DL 30 which, if the output of the low pass filter DL 28 is at 1000 cps, generates a logic "0", and if the output of the low pass filter DL 28 is at 2000 cps, generates a logic "1". This comparator output signal then goes into the circuitry that detects when a leader pulse has occurred.

A leader pulse is detected by first passing the signal outputted by the comparator DL 30 through a high pass filter DL 32 which only passes pulses that are longer than 2 ms. The only pulses, therefore, that will pass through this high pass filter DL 32 are leader pulses, since they are over 4 ms in duration versus the data pulses which are less than 1 ms in duration. The output of this high pass filter DL 32 is coupled to a flip-flop DL 34. A leader pulse turns on this flip-flop DL 34, thereby enabling the serial data which is following the leader to be coupled through to the UART DL 10 via AND gate DL 36. The UART DL 10 then reads in this serial bit string, checks the parity, and checks that the start and stop bit are in proper form. Receipt of the stop bit changes the state of UART DL 10's DR line. This state change is sensed by the PCC 12, 22, and indicates that a data word byte has been received. If the bit string has been transmitted properly, the UART DL 10 converts this bit string into an eight-bit parallel word for outputting to the PCC 12, 22. If, however, the UART DL 10 detects a parity or other error, this error status is transmitted to the receiving PCC 12, 22, and as a result, the message will be rejected. After completion of the entire message, the receiving PCC 12, 22 will send a message back to the PCC 12, 22 which had sent the defective message, requesting that the message be retransmitted.

As a further check, even if all three bytes of data in a given link message have been properly received by the UART, as reflected in correct parity for each byte, the check-sum data byte must also match the check-sum calculated separately by the receiving PCC 12, 22 using the data received from the first two bytes. If there is no match, again the PCC 12, 22 will request a retransmission of the message.

A request for retransmission is initiated by the PCC 12, 22 whenever a message has been incorrectly received. If a given trunk continues to create data link transmission errors, e.g. after 32 erroneous messages have been received in a span of 256 messages, the trunk is defined to be out of service by the PCC 12, 22. Thereafter, only if all other trunks are busy, will the PCC 12, 22 attempt to use this trunk again, at least until maintenance personnel checkout of the trunk has been performed. Note also that if all trunks are busy, no data link is needed, since no new switched path is available for a line requesting services. Only after a trunk goes idle due to a call disconnection will data link communication be reestablished.

The XMTR/RCVR 40, 50 may also contain a special test trunk which has access to the internal data link bus DL 90 via a second isolation transformer DL 70 for remote monitoring of the data link communication. This system access is totally separate from the keyboard 110 or the teletype interface 108 of the PCC 12, 22. This test input, however, does not give any ability to interact with the system, only monitoring is allowed. Remote traffic monitoring or the remote checking that the system is still communicating are possible applications for this test trunk. There is also the ability to disable the test trunk input by the relay DL 80 controlled by the PCC 12, 22.

2. SYSTEM OPERATION

A. System initialization and recovery

As previously mentioned, the concentrator 8 system of the present invention includes two separate processor control units 12, 22 having separate random access memories 76 therein, with one each in a respective central office terminal 10 and remote terminal 20. Thus, means are needed for the initialization of concentrator 8 system status, as stored in these memories, when the system is first powered up. Further means are needed for enabling the concentrator 8 system to recover from a power failure or other system malfunction when system status data in one or both of the RAMS 76 has been lost. To insure that both terminals 10 and 20 know the present state of the other terminal's switching network, and to insure that the two switching matrices 14 and 24 are in an identical state, the PCC's 12, 22 must establish interterminal data link communications. Only after a data link has been established, can initialization of the two terminals be completed. During the initialization process, system status information is transferred between one terminal and the other over the data link path. If system status has only been lost at one of the two terminals 10, 20, status information updating is performed mainly from the terminal that has retained the status data. Otherwise, both terminals must exchange data as to the current equipment status at their end of the system, e.g. how many lines are functional, how many switching matricies are operational, etc.

System initialization is performed automatically upon the start-up of the concentrator 8 system via the timeout of a watchdog timer 82 in each terminal 10, 20. The operation of this timer was described hereinabove. Basically, when each terminal's watchdog timer times out, it causes the associated microprocessor 60 in that terminal to be interrupted, to thereby cause it to automatically access a specific location in its associated ROM 74.

As seen in FIG. 3, the watchdog timer 82 essentially comprises a frequency divider 218 fed by a clock signal CLK. This frequency divider provides an output on the watchdog timer out line (WDTO) after 472 milliseconds have elapsed without the timer 82 having been cleared. This WDTO pulse sets a flip-flop 213 which enables the interrupt (INTR) flip-flop 211 to change state at the correct clock time needed by the microprocessor 60 as controlled by AND gate 214. This flip-flop output, in turn, is coupled to the microprocessor 60 as an INTERRUPT signal. Although the microprocessor 60 automatically clears all of its internal registers upon sensing that power has been turned on, when a restart has been generated, the INTERRUPT signal also causes the internal registers to be cleared. It further allows subsequent initialization steps to be performed, depending on the sophistication of the system using the microprocessor. In the present embodiment, the INTERRUPT signal causes the microprocessor 60 to address location 0000 in the ROM 74 which, in turn, points the microprocessor to the starting address of the control cycle program to be described below. Once the microprocessor 60 enters the interrupt state, this state is decoded in the start decoder 212. in response thereto, state decoder 212 sends out an INTR RESET pulse, to reset flip-flop 213. At the next clock time, this causes flip-flop 211 to be reset, thereby allowing the microprocessor 60 to begin processing.

Initially, the control program stored in each ROM 74 causes the associated PCC 12, 22 to determine how many line interface and trunk interface cards are provided in the terminal, the number of switch matrices S10, the operative state of the lines, etc., and to store this equipment status in corresponding trunk and line status tables in the RAM 76. Once these initialization procedures have been completed, each terminal attempts to initiate data link communications with the other terminal over the first available trunk. This attempt at setting up a data link continues through the accessing of each trunk periodically until a communication is successfully established. To avoid confusion, the remote terminal 10 is caused to perform the initial sending of a data link message, and the central office terminal 20 is caused to look for this message. The central terminal 20 does not attempt to send its own message initially to the remote terminal 10. Only when it has detected the remote terminal message will it send a message, which will be a response thereto.

In operation, the PCC 12 in the RT 20 chooses the first available trunk. In the trunk interface 26, the trunk relay T30 corresponding to this chosen trunk is actuated by the PCC 22, such that a signal from the data link transmitter and receiver (XMTR/RCVR) 50 is enabled to be coupled out over that given trunk. The message transmitted is in the form of a 2 second leader pulse followed by a "null" message. This message is transmitted in a standard way, as described above, via the UART DL 10 in the RT 20. If a message error occurs, or a timeout time occurs before a reply message is received from the COT 10, the RT 20 releases the trunk relay T30 and attempts to communicate again on another randomally chosen trunk in the same manner as just described. In this way, all trunks available for use by the RT 20 are rotated through communication attempts of 2 seconds each with the COT 10. Should this process fail to establish a communications link with the COT 10 after 256 cycles of attempts through all available trunks have been run, the process may be modified such that the trunk relays are not caused to be used at so high a switching frequency.

The communication scanning process at the COT 10 consists of cycling through each available trunk looking for the leader generated by the RT 20. To monitor a specific trunk, the PCC 12 in the COT 10 causes the relay T30 in trunk interface 16 corresponding to the chosen trunk to be pulled in. This enables any communication on that trunk to be coupled to the XMTR/RCVR 40 in the COT 10, and thereby to the PCC 12. The PCC 12 allows 30 milliseconds in which to detect the leader pulse, generated by the RMT 20, on the chosen trunk. If leader is not detected during this 30 millisecond time period, the chosen relay T30 is released by the PCC 12, and the next trunk in sequence is tested by the PCC 12 in the same way. As can be seen, if there are 32 trunks in operation between the RT 20 and the COT 10, approximately 0.9 seconds are required for the COT 10 to cycle through all trunks looking for leader.

When leader is detected by the COT 10, the COT 10 waits up to 3 seconds for the expected "null" message. If the "null" message is received by the COT 10, a "received" message is sent to the RT 20 over the same trunk. The COT 10 then waits 128 milliseconds for a further response from the RT 20. However, if a timeout or a message error is detected, the COT 10 will resume scanning for a leader on the remaining trunks. Should a "null" message from the central office terminal 10 be successfully received back at the RT 20, a successful data link has been established. The two terminals are then enabled to transmit requests as to the present equipment status of the lines, trunks and switching matrices in the two terminals. The number of available lines, switch paths, etc., available in each terminal is compared, and the sum of this data is stored in duplicate in the RAM 76 status tables in each terminal. Note that in this example since both the COT 10 and the RT 20 have just been powered up, no switched path data is in either of the terminal's status tables, therefore no interterminal comparison of this data is needed. A similar procedure is performed by each terminal when a data link path has been interrupted due to the fact that all trunks are busy with calls. After a trunk goes idle, the RT 20 sends a leader pulse out on this trunk, and waits for a response from the COT 10 to thereby reinstate the data link.

If the concentrator 8 system had been operating and one of the terminals lost power temporarily, the RAM 76 memory data in that terminal would be destroyed. Therefore, the trunk and line status tables in that terminal would have to be refreshed by data in the other terminal's RAM 76, to enable the present operating of the concentrator 8 system to continue. If table refresh were not possible, the entire concentrator 8 system would have to restart from scratch, since there would be no way for either terminal to know which lines were switched to which trunks. Such a situation does occur when both terminals lose power at the same time, since neither terminal would then know which switch paths are presently in use.

Recall that since the relays in the switching matrices 14, 24 are latching relays, this enables the presently hooked up subscriber paths to continue to exist during a power failure. Consequently, only through manual intervention by maintenance personnel or by waiting for all subscribers to disconnect, would the two terminals be able to clear all of their relay paths without causing any conversations to be cut off. Only when this has been completed would each terminal be able to reinitialize their RAM 76 status tables. In the present embodiment, however, after a power failure at both terminals, 10, 20, all relays are immediately reset upon system power-up, with no ability to save calls still in progress.

The two terminals 10, 20 keep track of the present state of the above status table recovery process by means of a recovery state number stored in the RAM 76 in each terminal. A "1" state exists between the time that recovery is initiated and the time that communications are reestablished between the terminals. A "2" state is entered by the terminal transmitting table refresh data to the terminal that has lost this data. A "3" state is entered by the terminal being refreshed. A "6" state occurs when both terminals are in need of table refresh. This state is entered by both terminals to cause all switching connections in the terminal to be released which had been previously preserved.

The need for table refresh is indicated by a terminal in the following way. Upon receiving a "null" message during the above data link communication recovery, the COT 10 sends one of two messages to the RT 20 depending on its situation, i.e. "I have recovered" or "I need table refresh." When the RT 20 receives either of these two messages, it knows that data has been successfully transmitted in both directions over the data link. The RT 20 then sends a similar message to the COT 10. If the COT 10 needs data, the RT 20, if recovered, will reply with "here comes data" followed by a block of status table data. A similar procedure is performed if the COT 10 has data which the RT 20 needs. If both the COT 10 and the RT 20 need table refresh, the recovery state memory location in both terminals is set to 6 to initiate the system relay clearing process.

To perform the table refresh process, a special block data transmission process is utilized to transmit the appropriate tables to the requesting terminal. A total of 16 bytes of data are transmitted at a time. This minimizes the effect of data transmission errors without making the table transmission time excessive. If a UART check byte error is detected during block data transmission, a "data bad" message is returned by the far terminal. This causes the near terminal to retransmit the previous sixteen byte block of table data. If more than a preset number of errors are detected during a block data transmission, the entire process is aborted and the communication scanning process is reentered to find a more operational trunk. If the entire block is received without errors, a "data good" message is returned by the far terminal, thus allowing the near terminal to transmit a new block of data. If all status data has been transmitted, the refresh process is ended and both terminals are enabled to resume subscriber call processing.

Due to the fact that switch matrix units may have been removed by maintenance personnel during the system failure time, the terminal with the refreshed information will also check its equipment status. The terminal receiving table refresh data will then compare this data with what that terminal has found to be its actual present equipment status. If a discrepancy is found in a given operational unit, a message is sent back to the terminal originating the refresh data to "make unit unavailable." When this process is completed, therefore, the status tables in both terminals will contain the same information as to the present operational status of the entire concentrator 8 system.

When both terminals need table refresh, they send "I am still disconnecting" messages back and forth until all previously busy switching relays have been cleared. Thereafter, table refresh from the COT 10 is performed on the RT 20 to insure that both terminals have the same status information with regard to the equipment available and operational at each end of the concentrator 8 system.

B. Control Cycle Operation

The control cycle program of each terminal 10, 20 of the concentrator 8 system is illustrated in flow diagram form in FIG. 5. Preferred means for implementing this control cycle program is by means of a ROM 74 in each terminal. The ROM 74 is programmed to give a predetermined output, either a logic 1 or a logic 0, on a plurality of data lines as a function of the address applied to the ROM 74 on its address lines. These data line states are what instruct and supervise the microprocessor 60 in its manipulation of the various elements in its PCC, and thus in the terminal. An essentially identical program is stored in each terminal 10, 20. The control cycle program is the system controller of each of the terminals 10, 20 in the concentrator 8 system.

As described above, the first function that is performed by the control cycle program after it is accessed by the microprocessor 60 in an interrupt mode, is the performance of its system initialization or recovery routine. Once this routine has been completed, the main portion of the control program is accessed, to enable concentrator 8 system subscriber call request analysis and other concentrator 8 system functions to begin.

As seen in FIG. 5A, the first function of the control cycle is to perform a PTASK. PTASK is short for Periodic Task Routine. FIG. 5B illustrates a flow chart of this routine. The PTASK is periodically accessed during the control cycle, to take care of various functions which must be performed by each PCC 12, 22 within a specific time. The PIASK routine will be covered in detail hereinbelow. However, initially some aspects of the routine should be known to enable a clearer understanding of the rest of the control cycle.

One major aspect of the PTASK comprises a plurality of timing tests for determining if one of a plurality of tasks is in need of being performed. These tasks are divided into two groups: primary tasks which have the most critical time dependance; and secondary tasks having less critical timing requirements. If a task timing test indicates that a time-out is to occur for a given task, the other major aspect of the PTASK is to cause the PCC 12, 22 to perform the required task. Once the task is completed, the PTASK again makes a check of task time-outs; and if none have occurred, it transfers system control back to the main control cycle.

Referring again to FIG. 5A, after the first PTASK accessing has been completed, the control cycle causes the microprocessor 60 to scan all the line detectors in the associated line interface 18 or 28 in the terminal, to determine whether or not a subscriber service request has occurred. In the RT 20 line interface 28 these are the off-hook current detectors L2(X), and in the COT 10 line interface 18 these are the C lead detectors L54(X). If such a service request is detected, this fact is stored in a queue in the respective terminal 10 or 20 to await call processing. Note that it is within the contemplation of the present invention to perform the line detector scanning described above in various ways, e.g. 8 lines at a time or by first detecting that a change has occurred in a group of line detectors, and only if a change is detected, finding out the identity of the line requiring service. In such ways, a significant amount of time is not taken up in the scanning process between times that the control cycle is caused to access the PTASK. Once the line detectors have been scanned, again the PTASK is accessed for testing of task time-outs to see if a task has to be performed.

After the PTASK has been accessed, the control cycle next causes the microprocessor 60 to scan the trunk loop current detectors T20(X) in the associated trunk interface 16 or 26 to determine which of the trunks are presently in use. Trunks found to be no longer in use are identified and stored in a hang-up queue for subsequent disconnection by the microprocessor 60 of the switched lines connected thereto.

After again accessing the PTASK, the control cycle in the RT 20 causes the PCC 22 to scan the ringing detectors 34 which are also tied to the trunks. A ringing detector is used to varify that a ringing signal is on the trunk pairs when a call is being coupled through the concentrator 8 system via the COT 10. The ringing detectors 34 thus verify that the subscriber call is properly being terminated at the RT 20.

After again accessing the PTASK, the control cycle scans its keyboard 110 and TTY interface 108 inputs to determine whether a command has been entered to the terminal. If a command has been entered, this command is processed. Further information on the operational procedure involved in concentrator 8 system commands is given in the next section of the specification.

The control cycle then tests to determine whether or not an "enter freeze mode" command has been inputted. A freeze mode is implemented by maintenance personnel to allow switching units and certain other units in the terminal to be changed without incurring the risk of shorting out these boards while they are being pulled in and out. All scanning and switching operations are stopped while in the freeze mode. The frozen terminal replies to all messages "I am frozen". In response thereto, the far end terminal will not try to originate any new switching requests. Prior to entering the freeze mode, the terminal will enable all currently pending switching requests to be processed. A "remove freeze mode" command must be entered to take the terminal out of the freeze mode.

Once the control cycle has tested for a freeze mode command and found none, or if a freeze mode command has been removed, the control cycle, after again accessing the PTASK, next performs various alarm processing or on-line diagnostic routines. These various routines will be described in more detail hereinbelow.

Once the alarm processing or on-line diagnostic routines have been completed, the control cycle is caused to be branched back, as seen in FIG. 5A, so that scanning of subscriber service requests, etc., may be repeated. Note that the above described control cycle operation is essentially identical in both the COT 10 and the RT 20. The times during which the various steps are performed, however, is asynchronous between the two terminals. In other words, the COT 10 may be in the process of performing a periodic task while the RT 20 is in the midst of scanning its off-hook detectors for a subscriber service request. Again, the only interaction between the two terminals is via the data link whereby call processing information and other status information is transferred between the two terminals.

Referring again to FIG. 5B and the periodic task routine, it will become apparent that this routine provides the important timing functions for the various tasks needing to be performed by the given PCC 12, 22. For example, the PTASK keeps track of when a message is supposed to be received by the terminal, and the timing of the responsive message. The PTASK also: updates traffic statistic registers; performs hangup and disconnection requests; resets the watchdog timer; and other time-out scheduled tasks. The PTASK is accessed a plurality of times during the control cycle to ensure that this routine is accessed at least once every 10 milliseconds.

As can be seen in the flow chart of FIG. 5B, the first test performed by the periodic task routine is to determine whether or not the watchdog timer overflow bit is on. This overflow bit goes on during the last timing period of the watchdog timer. If the bit is found to be on, the PTASK causes the watchdog timer to be reset.

After testing the state of the watchdog timer, the PTASK tests to see if the UART DL 10 in the XMTR/RCVR 40, 50 is in need of message processing. In the present embodiment, the PTASK determines first if the UART DL 10 is available for either a transmission or reception of a data link message. If it finds a transmission to be enabled, only then does the PTASK enable a queued subscriber service request to be analyzed, i.e. a switch path is chosen to connect the requesting subscribers line to an idle trunk, and a message is formatted, such that both terminals can thereby generate a new path through the concentrator 8 system in response to the subscriber service request.

The PTASK test sequence is shown in FIG. 5B. If the PTASK determines that UART DL 10 message processing is enabled, it next tests to see if a message byte is to be sent to the opposite terminal, or if a message is to be received from the opposite terminal. Each terminal is enabled alternately to have the opportunity to transmit a message. Consequently, if a message reception has just been completed, the terminal receiving the message is enabled to control its UART to transmit a next message, the contents of the message depending on the priority of messages waiting to be serviced in that terminal.

If a message is to be sent to the far terminal, the PCC 12, 22 loads a byte of data into the UART. The UART DL 10 then automatically is enabled to complete the message transmission. The PTASK then tests to see if this is the last byte to be transmitted in a given message. Recall that three bytes of data, as seen in FIG. 12B, comprise a complete data link message. If there are one or more additional bytes to be sent, these bytes are sent after a time-out time has been sensed during a subsequent pass through PTASK. If it is found that the present byte being sent is the last byte in the message, the PTASK sets a flag to indicate that the PCC 12, 22 associated therewith is to receive data from the opposite terminal at the next time-out time which is set in conjunction therewith. Again, as seen in FIG. 5B, the PTASK then transfers out of the UART processing section.

If a message is to be received, the PCC 12, 22 is directed to process this message, including checking of all parity and check sums therein. The PTASK then checks to determine if a reply is required for the given message received from the opposite terminal. If it is, the required reply is formatted, and transmission of the message begun in response thereto. The PTASK enables a leader to start, and a message time-out time is set. Again after this step, the PTASK transfers out of the UART processing section.

Finally, if a message reply is not required after a message is received from the opposite terminal, the PTASK enables the PCC 12, 22 to select a message to be sent to the opposite terminal according to the priority of current message requests that are queued in the PCC 12, 22. One of the highest priority tasks would be if a message is to be formatted to enable a subscriber service request to be serviced. When such a service request is queued, the PTASK proceeds to scan for idle trunks and available switching paths through the terminal switch matrix. The routine then decides upon an appropriate line link and trunk for service. Lastly, the routine then formats a message to the far terminal indicating that a connection request is being made for that particular switch path and trunk. This message includes an indication of the identity of the idle trunk and switch path chosen. Note that if the far terminal does not receive this message without error, it will request that the message be repeated. The last step in this portion of the PTASK is the starting of a leader and setting of a time-out time after which time the sending terminal will look for a new message from the opposite terminal. If a message is not received after the time-out time, an error condition is indicated. Control cycle fault diagnosis of such error conditions is described hereinbelow.

If there are no pending subscriber service requests, other terminal messages of lesser priority are sent to the opposite terminal. For example, each terminal automatically communicates status information to the other for comparison thereof. This is to insure that the separate status tables in each terminal 10, 20 continue to match one another.

The next PTASK test is the check of whether or not a primary time-out has occurred in the XMTR/RCVR 50. If this is found to be true, the primary task associated therewith is then performed. The most critical time dependent task is to make sure that the UART DL 10 in the terminal is periodically accessed by the PCC 12, 22. If data link data is not received by the PCC from the UART DL 10 every 10 milliseconds, this data is lost since the next byte of data will be written over the old data. PTASK control returns, as seen in FIG. 5B, to a point above where the subscriber service requests test is performed, after completion of the primary task so that further UART message processing may be performed, if needed.

If no primary task is required, the PTASK checks to determine if a secondary task time-out has occurred. Secondary tasks include such functions as disconnection tests, etc. In the disconnect example, the microprocessor 60 is directed via the hang-up queue to confirm that a customer has disconnected. The procedure is that after hand-up is detected, the PCC waits 800 milliseconds before it checks the condition of the trunk again. This is to prevent erroneous disconnections of a call in progress caused by transients on the line. After the disconnection is verified, the trunk number involved is placed in a separate queue to await actual disconnection of that trunk from the subscriber line switched thereto. The terminal detecting subscriber call disconnection then sends a disconnection request message to the far terminal. Both terminals 10, 20 then perform the actual disconnection of the associated switch 14, 24 relays. Note that disconnection requests have a lesser priority than subscriber connection requests.

Another secondary task time-out example is that the relays in a given switch matrix S10 can only be actuated or released after a minimum wait time of 100 milliseconds. This is a result of capacitive effects which are present in these circuits. Thus, only after this 100 millisecond time-out has occurred will a matrix S10 relay switch path be changed.

When a secondary task has been completed, the control in the PTASK is again transferred back to a point in the PTASK prior to where a communication service test is made. If no time-outs have been detected in a pass through the PTASK, program control is returned to the main control cycle at the point where the cycle left off.

C. System Commands and Interterminal Messages

Table I lists the various messages which are possible between the two terminals in the concentrator 8 system. As can be seen from table I, each message is composed of two bytes of message identifying data, with a third byte used as a check byte for insuring that the message has been properly transmitted. The format of a message was discussed above in the data link section of this specification and is illustrated in FIG. 12. Many of the messages listed in the table have already been discussed. Most of the others are self-explanatory. Note that the second byte in many cases is used for identifying a particular address, line number, trunk number, or other specific identifying number needed to complete understanding of the message by the terminal receiving the message. For example, if one terminal finds a line out of service, it will send a message to the far terminal to "place line out of service" by sending a 051 in byte 1 and by sending the identity of the subject line as byte 2.

TABLE 1

| BYTE 1 | BYTE 2 | MEANING |
| --- | --- | --- |
| 000 | 000 | RETRANSMIT FAR END MESSAGE |
| 001 | AAA | STATUS ADDRESS FOR COMPARISON (NO OTHER MESSAGE REQUESTS) |
| 002 | CCC | STATUS CONTENTS FOR COMPARISON (NO OTHER MESSAGE REQUESTS) |
| 003 | 000 | NULL MESSAGE |
| 004 | 000 | SWITCHING REQUEST DENIED |
| 005 | 000 | 'I AM FROZEN' |
| 006 | 000 | 'I HAVE RECOVERED' |
| 007 | 000 | 'I NEED TABLE REFRESH' |
| 010 | AAA | 'HERE COMES DATA BLOCK' + BLOCK ADDRESS (LSB) |
| 011 | 000 | 'I STILL HAVE DISCONNECTIONS TO MAKE' |
| 012 | 000 | BLOCK DATA TRANSMISSION GOOD |
| 013 | 000 | BLOCK DATA TRANSMISSION BAD |
| 014 | 000 | RESTART THE RECOVERY PROCESS |
| 015 | UUU | MAKE UNIT UNAVAILABLE |
| 016 | 000 | FAR END KEY COMMAND BUSY |
| 017 | 000 | FAR END KEY COMMAND DONE |
| 020 | TTT | FAR END TROUBLE NUMBER PART 1 |
| 021 | TTT | FAR END TROUBLE NUMBER PART 2 |
| 022 | 000 | CLEAR KEYBOARD COMMANDS |

TABLE 1-continued

| BYTE 1 | BYTE 2 | MEANING |
|---|---|---|
| 023 | SSS | MINOR ALARM STATUS UPDATE |
| 024 | SSS | MAJOR ALARM STATUS UPDATE |
| 041 | LLL | LINE ADMINISTRATIVE LOCKOUT |
| 042 | LLL | LINE ADMINISTRATIVE LOCKOUT REMOVAL |
| 043 | OTT | TRUNK MAINTENANCE LOCKOUT |
| 044 | OTT | TRUNK MAINTENANCE LOCKOUT REMOVAL |
| 045 | LLL | LINE MAINTENANCE LOCKOUT |
| 046 | LLL | LINE MAINTENANCE LOCKOUT REMOVAL |
| 047 | LLL | CLEAR DOWN LINE |
| 050 | OTT | CLEAR DOWN TRUNK |
| 051 | LLL | PLACE LINE OUT OF SERVICE |
| 052 | OTT | PLACE TRUNK OUT OF SERVICE |
| 053 | LLL | PLACE LINE IN SERVICE |
| 054 | OTT | PLACE TRUNK IN SERVICE |
| 055 | OOO | REQUEST FAR END TROUBLE NUMBER |
| 056 | OOO | CLEAR ALL FAR END TROUBLE NUMBERS |
| 057 | OOO | CLEAR ALL ALARMS |
| 1XX | XXX | CONNECTION REQUEST |
| 2XX | XXX | DISCONNECTION REQUEST |

The connection and disconnection request messages are formatted slightly differently. A larger amount of data needs to be transmitted during such messages, since the connection request requires not only the identity of the line requesting service and the trunk intended for coupling the line to the opposite terminal, but also the switch path chosen by the originating terminal for coupling the line to the trunk. As described above, a two stage switching network is used, so that both a line link switch path (first stage) and a trunk link switch path (second stage) must be identified. In a disconnection request, only the line number and trunk number need be transmitted, since at this point both terminals would have retained the line link and trunk link switch path data corresponding to the given line number and trunk number.

Table II lists the various commands available to maintenance personnel or other operators of the system. These commands are divided up into 4 classes, the system operation commands, line commands, trunk commands, and traffic commands. The traffic commands will be described below in the next section.

Commands are entered into a terminal via numerical keys on the keyboard 110. In the present embodiment, the keyboard 110 is a TOUCH TONE ® style keyboard which also includes an asterisk (*) and a number symbol (#) key. Keys on a teletype unit are also readable in a similar way via the TTY interface 108 in the PCC 12, 22. The display 106 in each concentrator 8 terminal also provides an important function in the inputting of commands and in the overall information transfer process between maintenance personnel and the concentrator 8 system. For example, as described in more detail herein, the display 106 automatically displays a trouble number if a system malfunction has

TABLE II

| SYSTEM OPERATION COMMANDS | LINE COMMANDS |
|---|---|
| 0 - Abort. | The line commands are, as follows: |
| 1 - Single display of memory location contents. | 39 - Display administrative lockout status. |
| 2 - Set real time clock. | 41 - Display near terminal's line status. |
| 3 - Decimal display of memory location contents. | 42 - Display far terminal's line status. |
| 4 - Continuous display of memory location contents. | 43 - Displays line's trunk number. |
| | 44 - Place line in service. |
| | 45 - Release line's path. |
| 5 - Display the far terminal's trouble numbers. | 46 - Maintenance lockout. |
| | 47 - Remove maintenance lockout. |
| 9 - Clear alarm. | 48 - Administrative lockout. |
| 11 - Clear keyboard. | 49 - Remove administrative lockout. |
| 12 - Clear near terminal's trouble numbers. | 64 - Display line group busy status. |
| | TRUNK COMMANDS |
| 13 - Clear far terminal's trouble numbers. | The trunk commands are, as follows: |
| | 51 - Display near terminal's trunk status. |
| 14 - Clear communication error-counts. | |
| 18 - Reinitialize near terminal. | 52 - Display far terminal's trunk status. |
| 19 - Reinitialize far terminal. | |
| 21 - Enter freeze mode. | 53 - Display trunk's line number. |
| 22 - Remove freeze mode. | 54 - Place trunk in service. |
| 23 - Disable communication trunk switching. | 55 - Release trunk's path. |
| | 56 - Place trunk maintenance-out-of-service. |
| 24 - Enable communication trunk switching. | 57 - Remove trunk maintenance-out-of-service. |
| 25 - Select line for forced path. | |
| 26 - Select trunk for forced path. | |
| 27 - Select link for forced path. | |
| 28 - Clear forced path selection. | |
| 61 - Select memory bank at far terminal, which will be addressed in the next command (62). | |

TABLE II-continued

62 - Select the address (0-3778) in memory bank. The address contents will be sent from far terminal to be displayed at near terminal.
63 - Redisplay contents of the last address that was displayed in command 62.
65 - Display trunk number that is currently in use for data communications.

--- been detected by the terminal wherein that display 106 is located. Trouble numbers generated at the far terminal are not automatically shown before inputting of commands is enabled. The trouble number displayed on display 106, and all other trouble numbers which may have been queued in the near terminal's RAM 76 memory, must be read out via this display unit or via the TTY interface 108.

When a given terminal is ready to accept a command from the keyboard 110 or from a teletype unit connected to the terminal, that terminal can be instructed to perform, as desired, any of the operational, traffic, line, or trunk commands. All commands inputted to the terminal must be followed by an asterisk before the terminal will respond to the command.

Almost immediately after the command is inputted to a terminal, an acknowledgement of the command is provided by the terminal in the form of one of five letters A-F which are displayed on the display 106. An A indicates that all commands are cancelled. This letter disappears from the display 106 after 2 or 3 seconds. A B indicates that the system is busy with call processing. Commands will be processed when the system has finished this higher priority processing. Command processing is signified by the display changing to a C, indicating that the command has been completed successfully, or an A indicating that the terminal cannot process the command. An E indicates that the terminal expects a data entry on the keyboard 110 to follow the command entry. For example, a command requesting line status data must be followed by the line number. An F is displayed to indicate that this terminal is in a freeze mode. Only after the freeze mode is released will the display go blank. During a freeze mode, no commands are processed by the PCC except the "remove freeze mode" command.

Referring to Table II, one can see that many of the commands listed are self-explanatory. The "abort" command clears the inputs and stops execution of any command in progress. An A is displayed on the display 106 in response to this command for a period of about 2 seconds. If a 1, 3, or 4 command is inputted, a specific memory location may be accessed after entry of such a command, the memory address desired must also be inputted. If continuous display of a memory location is desired, the display 106 shows the contents of the specified memory location as it changes state in real time.

To enable maintenance personnel acting at one terminal to find out the present operating state of the terminal at the other end of the concentrator 8 system, a 5 command enables the system operator to display at the near terminal any trouble numbers which may presently exist at the far terminal. As can be seen, a memory location at a far terminal may also be displayed on the near terminal's display 106 via commands 61-63.

Three important memory locations in each terminal that are accessable via the above commands, are the locations which store the terminals major alarm status, minor alarm status, and hardware alarm status. The alarm and power unit 104 in each of the PCC's 12, 22 keeps track of many of the concentrator 8 system conditions. If one of these conditions is found to be faulty in the alarm processing section of the control program, this information is stored in one of the above described status table locations. This unit 104 also may turn on an alarm light and audible alarm to indicate the occurrence of such a condition.

In the preferred embodiment of the present invention, a major alarm will occur if there is: a loss of communications between the terminals; a watchdog timer time-out; or the detecting of certain errors through diagnostic routines to be described hereinbelow. Minor alarm conditions include: loop current seen on an idle trunk; excessive communications errors; table status miscomparison between the two terminals; and the occurrence of a freeze mode, among others. Hardware alarm conditions include: a malfunctioning clock; an open door at the remote terminal; excessive temperature at the remote terminal; and power failure at the remote terminal.

The two reinitialize commands 18 and 19 enable maintenance personnel to force a reinitialization of a selected terminal of the concentrator 8 system. Thus, the system may be commanded to either force table refresh of RT 20 with status table data stored in the COT 10, or vice versa. These commands, along with commands for forcing a specific switch path, for displaying a memory location, etc., are especially useful for preliminary checkout of the system.

Commands 23 and 24 enable maintenance personnel to either disable or reenable data link communication switching, i.e., preventing switching of the data link among the various trunks available in the concentrator 8 system. Normally, after each subscriber service request is processed and a call is switched through the concentrator 8 system, the data link path is switched, from the present trunk being used, to a new trunk if a trunk is available. This is to provide a means for checking, on a periodic basis, the functioning of all trunks available in the concentrator 8 system. Maintenance personnel may wish to prevent this random switching of the data link between available trunks during certain diagnostic testing or other maintenance testing of the concentrator 8 system.

Also available for maintenance personnel check out of the concentrator 8 system is the ability to command a specific path to be forceably switched through both terminals in the concentrator 8 system. This function is performed via the commands 25-28 which enable a line a trunk, and switch links to be selected for the forced path.

The line and trunk commands listed are provided for two purposes. First, they enable the present status of a given line or trunk to be displayed for maintenance personnel evaluation. Secondly, these are maintenance lockout and administrative lockout commands available to lockout any line, and maintenance out of service commands to lockout any trunks. Maintenance lockout is necessary to prevent the PCC in a given terminal from recognizing an input from a line which may be malfunctioning and providing an erroneous subscriber service request on a continuous basis. This happens, for example, in severe weather conditions when lines may be shorted together. The administrative lockout command is provided to enable the restricting of a subscriber who for one reason or another is to have his service discontinued for a contemplated short period of time, e.g. for billing purposes. Note that maintenance lockout of a line is automatically removed when the off-hook detector goes off. Maintenance lockout may also be removed manually. Further, administrative line lockout of a line only prevents outgoing calls originating from that subscriber. That line can still receive incoming calls. This line status remains in effect until it is removed manually.

The information retained in the RAM 76 status table for each trunk and line should also be mentioned at this point. The overall organization of the RAM 76 in each terminal 10, 20 was described above and is illustrated in FIG. 4. The line status tables include a storage bit representing the present state of each of the following conditions for each line:
1. Line is idle.
2. Line is busy (loop current detected).
3. Line is ringing (before loop current).
4. Line is reordering.
5. Line is stuck (off-hook detector always on).
6. Line placed out of service by system.
7. Line placed out of service manually.
8. Line not equipped.

Also retained is the identity of the link path and trunk when a line is being coupled through the concentrator 8 system. Note that a plurality of bits of storage are required for this latter data for each line.

Trunk status tables include a storage bit representing the present state of each of the following conditions for each trunk:
1. Trunk is idle.
2. Trunk is busy (loop current detected).
3. Trunk is ringing (before loop current on term. call).
4. Trunk is pending loop (before loop on orig. call).
5. Trunk is pending disconnection.
6. Trunk placed out of service by system.
7. Trunk placed out of service manually.
8. Trunk not equipped.

Also retained is the identity of the line presently being coupled through to the given trunk. Again, this requires a plurality of bits of storage for each trunk.

D. Traffic Analysis

Table III lists the various traffic commands available in the apparatus of the present invention. The control cycle program performs the data acquisition needed for traffic analysis as part of its on-line diagnostics routine. The information desired is stored in allocated memory locations in the RAM 76. Basically, traffic analysis enables a traffic engineer to determine system usage quickly. For example, this routine enables a determination of which line groups with a particular switch matrix are experiencing heavy link blockage due to heavy use by subscribers attached to that switch matrix. There are eight line groups in a 64 line system. The routine performs traffic studies of individual lines within a line group to identify a heavy user therein, and it performs real time studies of traffic usage over extended periods of time. Periods of up to one week may be tested to determine busy hour activity.

When a heavy user is identified within a given line group, the traffic engineer can decide to either move the user to another line group that does not have such heavy usage, to thereby lower the incidence of link blockage, or he may want to take the heavy user completely out of the concentrator 8 system. It also provides the engineer with needed data as to the overall system performance and provides an indicator for future system upgrading needs based on present system usage.

TRAFFIC COMMANDS

The traffic commands are, as follows:
31—Total calls.
32—Total blocked calls.
33—Display busy-hour traffic (i.e. CCS).
34—Set busy hour.
35—Display near terminal trunk blocking.
36—Display far terminal trunk blocking.
37—Display near terminal link blocking.
38—Display far terminal link blocking.

TABLE III

The traffic commands listed in table III provide the ability to display the total number of calls, the total of blocked calls, the busy hour traffic in a selected busy hour, and the occurrence of trunk blocking. Note that commands 31-34, 36 and 38 are commands only available in the COT 10. Commands 35 and 37 are available in both terminals. Also, display 106 displays the contents of electronic peg count registers when a traffic command is made. In the present invention, these registers count consecutively from 0 to 9999 and then automatically reset to 0. These registers cannot be reset by external command.

E. System Maintenance and Fault Diagnosis

On-line diagnostic routines are periodically accessed by each terminal 10, 20. These routines automatically check conditions such as:
1. ROM memory checksums—for each 2000 bit memory chip, a checksum is kept to detect if any bits of data in that chip have somehow been lost.
2. RAM 76 operation checks—a set bit pattern is loaded into each memory location periodically, and then read out again. A mismatch in the readout pattern indicates a malfunction of that memory location.
3. Maintenance Monitor 100 tests—signals outputted from output ports 66 and 70, in the PCC 12 or 22, are wrapped around and fed back to the microprocessor 60 via this monitor 100 to check for data mismatches.

One chunk of diagnostic routine is performed during each accessing of the routine by the control cycle program. If a fault is detected, a trouble number is generated based on a diagnosis of where the error is and what plug-in subsystem should be replaced to rectify the problem.

Other on-line diagnostics may be called by maintenance personnel or automatically by the control cycle program in response to a detected fault for diagnosis thereof. Based on the fault detected and diagnosed by such routines, a trouble number is formatted and placed in a storage queue in the RAM 76 for subsequent display in the display 106 in response to a maintenance personnel command.

Some diagnostic routines also include fault recovery means wherein the terminal is caused to be reconfigured and to recover from the detected fault, if possible. The terminal restores normal operating functions by rerouting around any detected existing fault condition. Further, the terminal's PCC 12, 22 transmits the fault detected to the far terminal to enable that terminal to also reroute its functioning around the fault, e.g. to also place the defective line or trunk out of service.

One example of fault recovery is when a trunk has been automatically placed out of service due to too many data link transmission errors. When all other trunks are in use, the control program will cause the PCC to re-attempt a data link communication over this out of service trunk. If the problem has corrected itself, the trunk will be put back into service.

The trouble numbers are formatted to aid in the trouble-shooting by maintenance personnel of faults detected by the system. Written maintenance procedures are provided which correspond to the trouble numbers indicated by the terminal, and are written primarily to minimize the need for maintenance personnel to have extensive training or experience in the repair of the concentrator 8 system. All trouble-shooting procedures are designed to detect and replace defective plug-in units. Consequently, once a fault has been localized to this extent, maintenance personnel need only replace the faulty unit to return the concentrator 8 system to its full operating status. To further make repairs easier, the concentrator 8 system is designed to maximize the interchangeability of plug-in modules. All modules are identical between the COT 10 and RT 20 except for those relating to the line interface, ringing detectors, and auxiliary power functions.

Multiple problems can occur in more than one plug-in unit and can cause the above described replacement practice to be ineffective. If multiple problems are suspected, it may be necessary to replace all plug-in units listed in the repair procedure for the specific trouble code. As mentioned above, to further facilitate fault diagnosis, certain on-line diagnostics are also provided which are enabled to be performed only at the request of the maintenance personnel.

Note that both major alarms, e.g. power failure or loss of communication, and minor alarms, e.g. single line or trunk faults, detected by the maintenance program and placed out of service, are examples of problems that also generate a coded trouble number. Storage locations in the trouble number queue provide for a maximum of 10 trouble numbers to be stored at any given time in each terminal. An example of a trouble number displayed on the 4 digit display 106 would be C001. The trouble number would indicate that there is no loop current detected on an originating call from subscriber line No. 1. Another example would be D210. This trouble number indicates that the remote terminal 20 detects loop current on idle trunk No. 10.

Finally, the concentrator 8 system is designed to facilitate maintenance checkout and fault correction without affecting the otherwise normal operation of the system. On-line diagnostics can be performed, maintenance personnel communication with both terminals, either from the RT 20, the COT 10, or remote from both terminals via a TYY unit conventionally tied to either unit by a separate telephone line, can be performed. This interaction can even take the form of forcing a selected line to trunk path. The TYY can also have any data appearing on the display 106 printed on the terminal, thereby enabling remote readout of trouble numbers, traffic data, etc. Lastly, the freeze mode is provided to enable certain plug-in units to be replaced without causing subscribers using the system to have their service interrupted.

The present embodiment of this invention is to be considered in all respects as illustrative and not restrictive; the scope of the invention being indicated by the appended claims rather than by the foregoing description and all changes which come within the meaning and range of equivalency of the claims therefore are intended to be embraced therein.

We claim:

1. A line concentrator system for the interconnection of a plurality of lines over a lesser plurality of trunks including a terminal at each end of the concentrator system, said system comprising:
    means in each terminal for the detection of a system service request initiated by a line connected to that terminal;
    switching means in each terminal for enabling the switching of a plurality of lines, individually to a corresponding number of trunks;
    processor means in each terminal, including means for determining which trunks are idle, means for determining and selecting an idle switch path through said switching means from said service requesting line to a selected said idle trunk, and means for controlling the state of said switching means such that said selected switch path is generated thereby, said processor means having:
    (a) a data processor;
    (b) control program means for controlling the nature and sequence of the operation of said data processor;
    (c) a memory including a plurality of storage locations accessible by said data processor, for temporary storage of data needed by said data processor and control program; and
    (d) means for inputting or outputting data from said processor means under the control of said data processor and control program; and
    means for communicating the identity of said selected switch path and said idle trunk to the terminal opposite the terminal having said service requesting line;
    the processor means in said opposite terminal enabled thereby to generate a switch path corresponding to said selected idle switch path such that the opposite end of said selected idle trunk is connected to a line in said opposite terminal corresponding to said service requesting line.

2. The line concentrator system of claim 1 wherein said data processor comprises a microprocessor.

3. The line concentrator system of claim 1 wherein said data input/output means in each said terminal comprises I/O means for maintenance personnel interaction, said means comprising:
    a keyboard for the manual inputting of data and commands to said processor means;
    means for displaying data from said processor means for external readout;
    means for interfacing a teletype to said processor means for inputting of data and commands thereto and for printing out data on said teletype; and means for visually and audibly indicating system alarm conditions.

4. The line concentrator system of claim 3, wherein said data input/output means in each said terminal comprises means for selectively enabling data transfer with said I/O means and with said switching means, and means for communicating with said opposite terminal, said means comprising:
- a plurality of output ports, each port connected to a specific one of said I/O means, switching means, or means for communicating with said opposite terminal;
- a plurality of input ports, each said port connected to a specific one of said I/O means, switching means, or means for communicating with said opposite terminal;
- output port select means; and
- input port select means,
- said output port select means, under the control of said data processor and control program, acting to select a specific output port for enabling data from said microprocessor to be outputted therethrough, said input port select means, under the control of said data processor and control program, acting to select a given input port for the enabling of data from a specific input port to be coupled to said data processor.

5. The line concentrator system of claim 1 further comprising a watchdog timer, said data processor and control program including means for the periodic resetting of said watchdog timer, said watchdog timer further including means, when not reset by said data processor and control program, for timing-out and causing an interrupt of said data processor, said data processor being caused thereby to access the start of said control program.

6. The line concentrator system of claim 5 wherein said data processor and control program further comprises means for periodically monitoring the state of said watchdog timer, enabling said data processor to reset said watchdog timer before the occurrence of said watchdog timer time-out.

7. The line concentrator system of claim 1 wherein said control program means comprises a non-eraseable read only memory means including a plurality of memory locations having defined therein a list of control instructions for manipulation and control of the state of said data processor.

8. The line concentrator system of claim 1 wherein said means in each terminal for the detection of a system service request initiated by a line connected to that terminal comprises line interface means including a plurality of off-hook detectors for detecting and outputting a detection signal when the line operatively connected thereto is requesting service, each said detector operating to detect a voltage or current change on its associated line,
- said line interface means further including a line status multiplexer, said multiplexer selectively enabling said processor means to readout the detection signal from each one of said off-hook detectors.

9. The line concentrator system of claim 8, wherein said line interface means further comprises
- reorder generator means, including means for generating an all-trunks-busy signal;
- relay means including a plurality of relays; and
- means for selectively actuating one of said plurality of relays under the control of said processor means, said selected relay acting to switch onto a line requesting service said all-trunks-busy signal from the reorder generator to indicate to a subscriber that he should hang up and attempt a service request at a later time.

10. The line concentrator system of claim 1 wherein said means for determining which trunks are idle comprises:
- trunk interface means including a plurality of trunk loop current detectors, one each operatively coupled to a trunk, each said detector outputting a signal when its associated trunk is in use,
- said trunk interface means further including a loop current multiplexer for enabling the processor means to selectively readout the status of each said detector; and
- means for enabling said processor means to verify the proper operation of a trunk having a service requesting line switched thereon.

11. The line concentrator system of claim 1 wherein said means for determining and selecting an idle switch path through said switching means comprises means, under the control of said data processor and control program, for independently monitoring and storing in said memory in each terminal, the present system operational status, said status including the present state of said switching means, the identity of the trunks currently in use, and the identity of the lines currently in use, and further independently monitoring and storing in said memory in each terminal the present system equipment status, said status including the identity of the lines which are currently operational, the identity of the trunks which are currently operational, and the identity of the switch paths which are currently operational.

12. The line concentrator system of claim 1, wherein said switching means in each terminal comprises a two stage switching network including a first and second stage, each stage including a plurality of switch matrices, wherein each said switch matrix including a plurality of magnetically latching switches, wherein each said subscriber service line is attached to a switch matrix in said first stage, and wherein each said trunk is attached to a switch matrix in said second stage.

13. The line concentrator system of claim 12, wherein said means for controlling the state of said switching means comprises:
- an X axis select decoder in each said switch matrix;
- a Y axis select decoder in each said switch matrix; and
- means for selecting one of said switch matrices for switch actuation therein,
- said X axis select decoder, under the control of said data processor and control program, acting to select one of said X axes in said switch matrix, each said X axis having a plurality of switches operatively connected thereto, said Y axis select decoder, under the control of said data processor and control program acting to select one of said Y axes in said switch matrix, each said Y axis having a plurality of switches operatively connected thereto, each said selected X axis and Y axis combination having a single crosspoint, the switch operatively connected thereto being caused to actuate when said switch matrix is selected.

14. The line concentrator system of claim 13, wherein said switches in each said switch matrix are arranged such that when a given switch is actuated, all other switches on the same X and Y axis corresponding to said actuated switch are caused to be released if said switches were formerly in an actuated state, to insure thereby that no erroneous switch paths are generated in said switching means.

15. The line concentrator system of claim 1 further comprising a battery operatively associated with one of said terminals for enabling the continuation of system operation and retention of terminal status data during external power supply loss.

16. The line concentrator system of claim 1 further comprising system fault detection and diagnosis means.

17. The line concentrator system of claim 16, wherein said system fault detection and diagnosis means, in combination with said data processor and control program, comprises in each said terminal:
  means for the real time performance of fault detection routines, for detecting thereby system operational errors;
  means for storing in said memory and displaying a specific trouble number, to indicate the identity of the detected operational errors;
  means for storing in said memory subsequently detected faults;
  means for displaying a maintenance personnel said subsequent trouble numbers;
  means for maintenance personnel interaction with said terminal, including means for selection and execution of further maintenance routines, and including means for enabling the display of trouble numbers generated at said opposite terminal; and
  means for enabling said maintenance personnel to freeze the operation of said system, to enable replacement of faulty system components without damage to said system resulting therefrom.

18. The line concentrator system of claim 1, further comprising means, in combination with said microprocessor and control program, for system operators to lockout a selected line or trunk, such that service requests from a said locked-out line is not processed by said system, and such that said locked-out trunk is not used as an idle trunk for switching a subscriber service request thereon.

19. The line concentrator system of claim 1 further comprising traffic analysis means, said means including first counter means for maintaining the current count of incidences of trunk blocking; and
  second counter means for maintaining the current count of incidences of link blocking.

20. A line concentrator system for the interconnection of a plurality of lines over a lesser plurality of trunks including a terminal at each end of the concentrator system, said system comprising:
  means in each terminal for the detection of a system service request initiated by a line connected to that terminal;
  switching means in each terminal for enabling the switching of a plurality of lines, individually to a corresponding number of trunks;
  processor means in each terminal including means for storing systems status data, said storing means having a memory including a plurality of storage locations, means for determining which trunks are idle, means for determining and selecting an idle switch path through said switching means from said service requesting line to a selected said idle trunk, and means for controlling the state of said switching means such that said selected switch path is generated thereby; and
  data link means for communicating the identity of said selected switch path and said idle trunk to the terminal opposite the terminal having said servicing requesting line, and for communicating to said opposite terminal any said stored system status data and other data generated by said processor means.

21. The line concentrator system of claim 20, wherein said data link means further comprises means for selectively switching said data link onto an idle trunk randomly selected by said processor means and means in each said terminal for independently determining that said selected idle trunk is operational prior to the transmission between each said terminal of said data or commands, said random selection of said idle trunk enabling the current operational status of all trunks in said system to be periodically checked.

22. The line concentrator system of claim 20, wherein said data link means further comprises frequency shift keying transmission and reception means,
  said transmission means comprising:
    (1) means for the parallel to serial conversion of a digital data word inputted from said processor means into a serial bit string;
    (2) means for slowing down the data rate of said inputted data word, to enable transmission of said data over a voice grade trunk;
    (3) means for generating a leader pulse; and
    (4) means for converting said leader pulse and said data word into said frequency shift keying format,
  said receiver means comprising:
    (1) leader recognition means;
    (2) means responsive the recognition of receipt of a leader pulse by said leader recognition means for converting a subsequently received data word in frequency shift keying form into a digital serial bit string; and
    (3) means for serial to parallel conversion of said bit string, such that the resultant data word can be outputted to and read by said processor means.

23. The line concentrator system of claim 22, wherein said data word comprises three bytes of data, each byte having a plurality of information bits therein, said first and second bytes each including a start bit, a stop bit, and a parity bit, said third byte comprising a checksum of the data contained in said first and second bytes, said parity and checksum data enabling checking by said data link means and processor means of proper reception of said data word, said start and stop bits enabling the differentiation between adjacent bytes.

24. The line concentrator system of claim 20, wherein said data link means further comprises means for enabling the monitoring of said data link communications from a location remote from either terminal in said system.

25. The line concentrator system of claim 20 further comprising system initialization means comprising:
  means for initially surveying the present equipment status of said terminal, and storing this status data in said memory, including status data as to the present number of lines connected to the system and the number of trunks available;
  means for initially resetting said switching means to a cleared state; and means, in combination with said data link means, for establishing communication with said opposite terminal.

26. The line concentrator system of claim 25 wherein said means for establishing communication with said opposite terminal comprises:
  means at a selected one of said terminals, under the control of said processor means, for generating a leader pulse on a randomly chosen trunk;
  means at the terminal opposite said selected terminal for randomly monitoring each said trunk for detection of said leader pulse, and for replying to said selected terminal via said trunk when said leader pulse is detected;
  means at the selected terminal, for randomly selecting another said trunk for generation of a leader pulse thereon, when after a specified period of time, no reply is received from said other terminal, and for randomly selecting further trunks until said reply by said opposite terminal has been detected.

27. The line concentrator system of claim 20 further comprising recovery means for enabling a terminal that has lost system power and thereby system status data to regain said data from the opposite terminal when said data has been retained therein, said means comprising:
  means, in combination with said data link means, in said terminal not experiencing a power failure for transmitting its system status data, including the status of its switching means and equipment status, to the opposite terminal, said opposite terminal including means for inputting said data into corresponding storage locations in said memory, such that the system status stored in each terminal's said memory becomes identical, to enable thereby the re-establishment of system subscriber servicing operation.

* * * * *